United States Patent
Kittaka et al.

(10) Patent No.: US 11,519,501 B2
(45) Date of Patent: Dec. 6, 2022

(54) TRANSMISSION WITH SHIFT DRUM, ANGULAR SENSOR OUTPUTTING ROTATION OF SHIFT DRUM AS OUTPUT VALUE AND CONTROL UNIT CORRECTING OUTPUT VALUE

(71) Applicant: HONDA MOTOR CO., LTD., Tokyo (JP)

(72) Inventors: Eiji Kittaka, Tokyo (JP); Takashi Kudo, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 328 days.

(21) Appl. No.: 16/920,176

(22) Filed: Jul. 2, 2020

(65) Prior Publication Data
US 2021/0010589 A1    Jan. 14, 2021

(30) Foreign Application Priority Data
Jul. 12, 2019 (JP) .............................. JP2019-130374

(51) Int. Cl.
 *F16H 61/12* (2010.01)
 *F16H 61/32* (2006.01)
 *F16H 63/30* (2006.01)

(52) U.S. Cl.
 CPC ............. *F16H 61/32* (2013.01); *F16H 61/12* (2013.01); *F16H 63/304* (2013.01); *F16H 2061/1284* (2013.01); *F16H 2061/323* (2013.01)

(58) Field of Classification Search
 CPC .. F16H 61/12; F16H 61/32; F16H 2061/1284; F16H 2061/323; F16H 63/304; F16H 2342/02
 See application file for complete search history.

(56) References Cited

U.S. PATENT DOCUMENTS

| | | | | |
|---|---|---|---|---|
| 2009/0222182 | A1* | 9/2009 | Tomoda | F16D 48/02 701/67 |
| 2010/0050805 | A1* | 3/2010 | Hayakawa | F16H 63/18 74/473.28 |
| 2016/0195170 | A1* | 7/2016 | Sugano | F16H 63/18 74/335 |

FOREIGN PATENT DOCUMENTS

| | | |
|---|---|---|
| JP | 2001-315632 A | 11/2001 |
| JP | 2002-48595 A | 2/2002 |
| JP | 2006-194169 A | 7/2006 |

(Continued)

OTHER PUBLICATIONS

Indian Office Action dated Dec. 14, 2021, Application No. 202014028821, 6 pages.

(Continued)

*Primary Examiner* — Edwin A Young
(74) *Attorney, Agent, or Firm* — Rankin, Hill & Clark LLP

(57) ABSTRACT

A transmission includes a shift drum, an angular sensor, and a control unit. The control unit has reference values of the output values at a first rotation angle and a second rotation angle of the shift drum. The control unit is configured to obtain the output values at the first rotation angle and the second rotation angle as a first output value and a second output value, respectively. The control unit is configured to correct the output value output between the first rotation angle and the second rotation angle based on a difference between the first output value and the reference value at the first rotation angle and a difference between the second output value and the reference value at the second rotation angle.

9 Claims, 13 Drawing Sheets

(56) References Cited

FOREIGN PATENT DOCUMENTS

| | | |
|---|---|---|
| JP | 2007-24149 A | 2/2007 |
| JP | 2011-74935 A | 4/2011 |
| JP | 2012-177392 A | 9/2012 |
| JP | 2014-35063 A | 2/2014 |
| JP | 2017-048908 | 3/2017 |

OTHER PUBLICATIONS

Japanese Office Action with English translation dated Apr. 6, 2021, 13 pages.

\* cited by examiner

TRANSMISSION WITH SHIFT DRUM, ANGULAR SENSOR OUTPUTTING ROTATION OF SHIFT DRUM AS OUTPUT VALUE AND CONTROL UNIT CORRECTING OUTPUT VALUE

INCORPORATION BY REFERENCE

The present application claims priority under 35 U.S.C. § 119 to Japanese Patent Application No. 2019-130374 filed on Jul. 12, 2019. The content of the application is incorporated herein by reference in its entirety.

TECHNICAL FIELD

The present invention relates to a transmission.

BACKGROUND ART

As a prior art, there has been known a transmission that rotatably drives a shift drum directly by an actuator via a deceleration gear (for example, see Patent Literature 1). In Patent Literature 1, an angular sensor that detects a rotation angle of the shift drum and transmits this detection signal to a control device of the actuator is provided.

CITATION LIST

Patent Literature

[Patent Literature 1] JP-A No. 2017-48908

SUMMARY OF INVENTION

Technical Problem

With the conventional transmission, highly accurately detecting the rotation angle of the shift drum is important to control the actuator based on the rotation angle of the shift drum detected by the angular sensor.

The present invention has been made in consideration of the above-described circumstance, and an object of the present invention is to improve detection accuracy of a rotation angle of a shift drum in a transmission.

Solution to Problem

A transmission includes a shift drum (71), an angular sensor (78), and a control unit (35). The shift drum (71) is rotated by an actuator (72). The angular sensor (78) is configured to output the rotation of the shift drum (71) as an output value (S). The control unit (35) is configured to calculate a rotation angle of the shift drum (71) from the output value (S). The control unit (35) has reference values (R1, R2) of the output values (S) at a first rotation angle (A1) and a second rotation angle (A2) of the shift drum (71). The second rotation angle (A2) is different from the first rotation angle (A1). The control unit (35) is configured to obtain the output values (S) at the first rotation angle (A1) and the second rotation angle (A2) as a first output value (S1) and a second output value (S2), respectively. The control unit (35) is configured to correct the output value (S) output between the first rotation angle (A1) and the second rotation angle (A2) based on a difference (D1) between the first output value (S1) and the reference value (R1) at the first rotation angle (A1) and a difference (D2) between the second output value (S2) and the reference value (R2) at the second rotation angle (A2).

Additionally, the above-described configuration may be configured as follows. The rotation angle of the shift drum (71) is linearly correlated with the output value (S) from the angular sensor (78). The reference value (R) between the first rotation angle (A1) and the second rotation angle (A2) is represented by a straight line corresponding to the rotation angle.

Additionally, the above-described configuration may be configured as follows. The shift drum (71) has positions corresponding to respective shift positions. The first rotation angle (A1) is closest to an angle (θN) of the position corresponding to a lowest position of a shift among a plurality of the positions. The second rotation angle (A2) is closest to an angle (θ6) of the position corresponding to an uppermost position of the shift among the plurality of positions.

Additionally, the above-described configuration may be configured as follows. The shift drum (71) includes a lead groove (71b) that extends in a rotation direction of the shift drum (71). A shifter (75) that includes a pin portion (75a) engaging with the lead groove (71b) is disposed. The shift is performed by moving the shifter (75) along the lead groove (71b) via the pin portion (75a). The lead groove (71b) has end walls (85, 86) on both ends in the rotation direction of the shift drum (71). The first rotation angle (A1) is an angle at which the pin portion (75a) butts against one of the end walls (85, 86). The second rotation angle (A2) is an angle at which the pin portion (75a) butts against the other end wall (85, 86).

Additionally, the above-described configuration may be configured as follows. The pin portion (75a) has a columnar shape. The end walls (85, 86) have abutment surfaces (85a, 86a) abutting on an outer periphery of the pin portion (75a). The abutment surfaces (85a, 86a) have a curvature smaller than a curvature of the outer periphery of the pin portion (75a).

Additionally, the above-described configuration may be configured as follows. The abutment surfaces (85a, 86a) are flat surfaces.

Additionally, the above-described configuration may be configured as follows. Curved surface portions (85b, 86b) continuous with the abutment surfaces (85a, 86a) are formed on both ends in a width direction of the lead groove (71b). The curved surface portions (85b, 86b) have a curvature larger than the curvature of the outer periphery of the pin portion (75a).

Additionally, the above-described configuration may be configured as follows. The shift drum (71) is directly rotatively driven by the actuator (72) via a deceleration gear unit (73) disposed between the actuator (72) and the shift drum (71). The actuator (72) is configured to rotate the shift drum (71) by feedback control using the output value (S).

Furthermore, the above-described configuration may be configured as follows. The control unit (35) is configured such that when a correction amount (Vc) of the output value (S) exceeds a predetermined value (Vs), the control unit (35) determines that the angular sensor (78) has a failure.

Advantageous Effects of Invention

The transmission includes the shift drum, the angular sensor, and the control unit. The shift drum is rotated by the actuator. The angular sensor is configured to output the rotation of the shift drum as the output value. The control unit is configured to calculate the rotation angle of the shift drum from the output value. The control unit has the reference values of the output values at the first rotation angle and the second rotation angle of the shift drum. The second rotation angle is different from the first rotation angle. The control unit is configured to obtain the output values at the first rotation angle and the second rotation angle as the first output value and the second output value, respectively. The control unit is configured to correct the output value output between the first rotation angle and the second rotation angle based on the difference between the first output value and the reference value at the first rotation angle and the difference between the second output value and the reference value at the second rotation angle.

With this configuration, since the output value of the shift drum is corrected based on the plurality of values, which are the difference between the first output value and the reference value at the first rotation angle and the difference between the second output value and the reference value at the second rotation angle. This contributes to improvement in detection accuracy of the rotation angle of the shift drum.

Additionally, the above-described configuration may be configured as follows. The rotation angle of the shift drum is linearly correlated with the output value from the angular sensor. The reference value between the first rotation angle and the second rotation angle is represented by the straight line corresponding to the rotation angle.

With this configuration, since the output value from the angular sensor and the reference value are the straight lines, the correction based on the plurality of values allows correction of an inclination of the straight line of the output value from the angular sensor and contributes to improvement in the detection accuracy of the rotation angle of the shift drum.

Additionally, the above-described configuration may be configured as follows. The shift drum has the positions corresponding to the respective shift positions. The first rotation angle is the closest to the angle of the position corresponding to the lowest position of the shift among the plurality of positions. The second rotation angle is the closest to the angle of the position corresponding to the uppermost position of the shift among the plurality of positions.

With this configuration, since an interval between the first rotation angle and the second rotation angle increases, the first output value and the second output value can be obtained in a range of a wide rotation angle. This contributes to the improvement in detection accuracy of the rotation angle of the shift drum.

Additionally, the above-described configuration may be configured as follows. The shift drum includes the lead groove that extends in the rotation direction of the shift drum. The shifter that includes the pin portion engaging with the lead groove is disposed. The shift is performed by moving the shifter along the lead groove via the pin portion. The lead groove has the end walls on both ends in the rotation direction of the shift drum. The first rotation angle is the angle at which the pin portion butts against one of the end walls. The second rotation angle is the angle at which the pin portion butts against the other end wall.

With this configuration, the first output value and the second output value can be obtained at the angles at which the pin portion butts against the end walls of the lead groove. This contributes to improvement in accuracy of obtaining the first output value and the second output value. In view of this, the output value can be corrected after accurately identifying the rotation angle of the shift drum, and this contributes to the improvement in detection accuracy of the rotation angle of the shift drum.

Additionally, the above-described configuration may be configured as follows. The pin portion has the columnar shape. The end walls have the abutment surfaces abutting on the outer periphery of the pin portion. The abutment surfaces have the curvature smaller than the curvature of the outer periphery of the pin portion.

With this configuration, the pin portion can be correctly butted against the end walls of the lead groove, and this contributes to the improvement in obtaining the first output value and the second output value.

The above-described configuration may be configured as follows. The abutment surfaces are the flat surfaces.

With this configuration, the pin portion can be correctly butted against the end walls of the lead groove, and this contributes to the improvement in obtaining the first output value and the second output value.

The above-described configuration may be configured as follows. The curved surface portions continuous with the abutment surfaces are formed on both ends in the width direction of the lead groove. The curved surface portions have the curvature larger than the curvature of the outer periphery of the pin portion.

With this configuration, the abutment of the pin portion on the curved surface portions can be suppressed, and therefore, this allows suppressing an interference of the butting of the pin portion against the abutment surface by contact of the pin portion with the curved surface portion before the abutment on the abutment surface.

The above-described configuration may be configured as follows. The shift drum is directly rotatively driven by the actuator via the deceleration gear unit disposed between the actuator and the shift drum. The actuator is configured to rotate the shift drum by the feedback control using the output value.

With this configuration, since the rotation angle of the shift drum can be accurately detected by the correction, the rotation of the shift drum can be controlled with high accuracy in the configuration where the shift drum is directly rotatably driven by the actuator.

Additionally, the above-described configuration may be configured as follows. The control unit is configured such that when the correction amount of the output value exceeds the predetermined value, the control unit determines that the angular sensor has the failure.

With this configuration, the failure in the angular sensor can be determined by the simple method.

DESCRIPTION OF EMBODIMENTS

Hereinafter, embodiments of the present invention will be described with reference to the accompanying drawings. It is to be noted that, throughout the description, references to directions, such as front, rear, left, right, upward, and downward, are made identical to a direction to a vehicle body, unless otherwise stated. In the respective drawings, reference sign FR denotes the front of the vehicle body, reference sign UP denotes the upper side of the vehicle body, and reference sign LH denotes the left of the vehicle body.

First Embodiment

Figure 1:
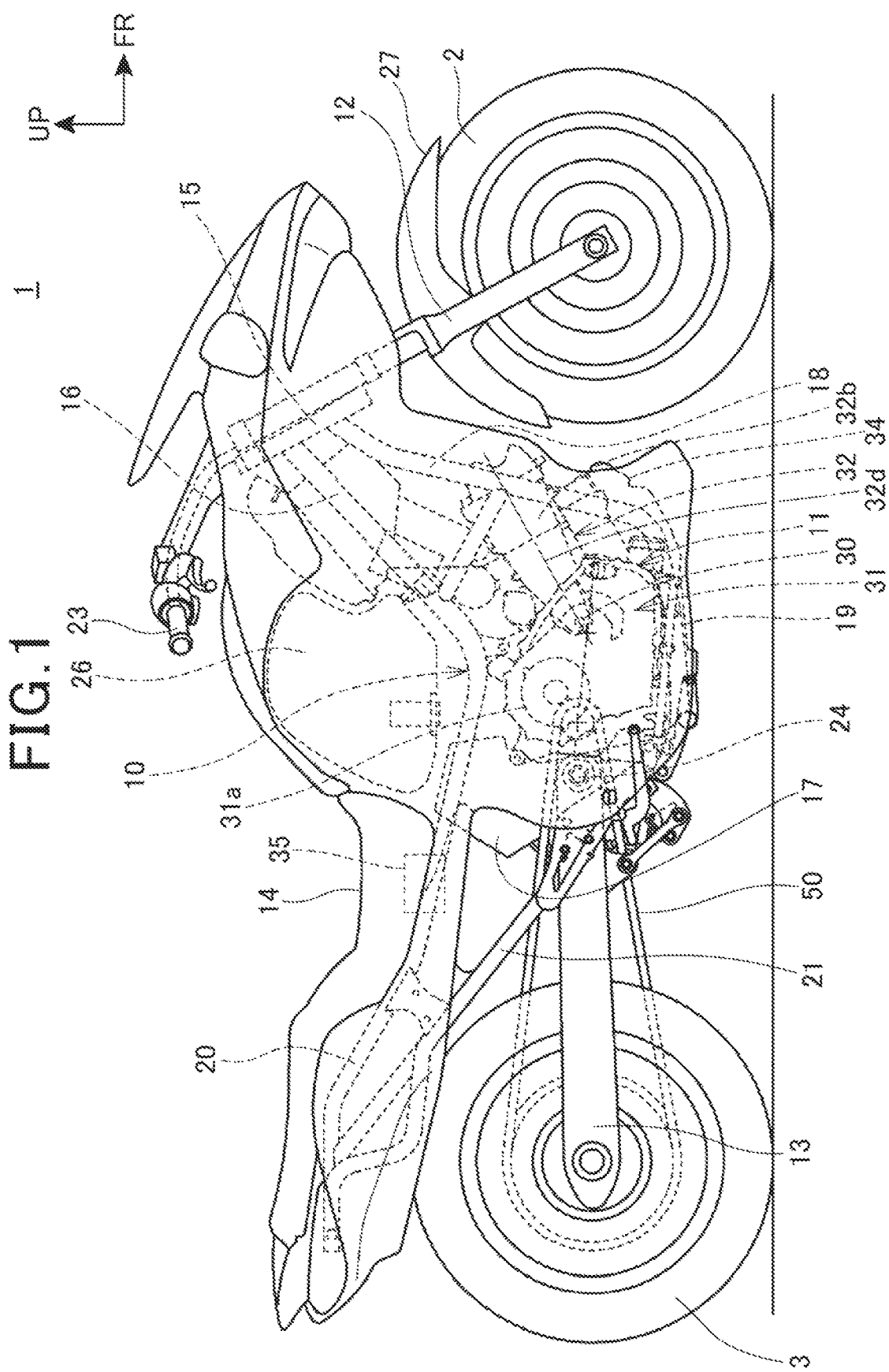
FIG. 1 is a right side view of a motorcycle according to a first embodiment of the present invention.

FIG. 1 is a right side view of a motorcycle 1 according to the first embodiment of the present invention.

The motorcycle 1 is a vehicle in which an engine 11 as a power unit is supported to a body frame 10, a front fork 12 that steerably supports a front wheel 2 is steerably supported to a front end of the body frame 10, a swing arm 13 that supports a rear wheel 3 is disposed on a rear portion side of the body frame 10.

The motorcycle 1 is a saddle riding vehicle including a seat 14 on which an occupant is seated astride. The seat 14 is disposed on an upper side of the rear portion of the body frame 10.

The body frame 10 includes a head pipe 15 disposed on a front end of the body frame 10, a main frame 16 extending downward to the rear from the head pipe 15, center frames 17 extending downward from the rear end of the main frame 16, a down frame 18 extending downward from the head pipe 15, and a lower frame 19 extending rearward from the down frame 18 and connecting to the center frame 17.

Additionally, the body frame 10 includes a seat frame 20 extending rearward from an upper portion of the center frame 17 and a sub-frame 21 connecting a lower portion of the center frame 17 to a rear portion of the seat frame 20.

The front fork 12 is turnably supported to the body frame 10 via a steering shaft (not illustrated) inserted into the head pipe 15. A handlebar 23 for steering is disposed on an upper end portion of the front fork 12. The front wheel 2 is supported to a lower end portion of the front fork 12.

The swing arm 13 is journaled by a pivot shaft 24 supported by the left and right center frames 17. The pivot shaft 24 extends horizontally in a vehicle width direction. The swing arm 13 has a front end portion journaled by the pivot shaft 24 and swings up and down around the pivot shaft 24.

The rear wheel 3 is supported to a rear end portion of the swing arm 13.

The engine 11 is disposed between the down frame 18 and the center frame 17 in a vehicle front-rear direction under the main frame 16 and is fixed to the body frame 10.

A fuel tank 26 is disposed between the head pipe 15 and the seat 14 above the main frame 16.

The seat 14 is supported to the seat frame 20 from the lower side. A front fender 27 is supported to the front fork 12.

The motorcycle 1 includes a control unit 35 as an electronic control unit that controls an operation of the engine 11.

Figure 2:
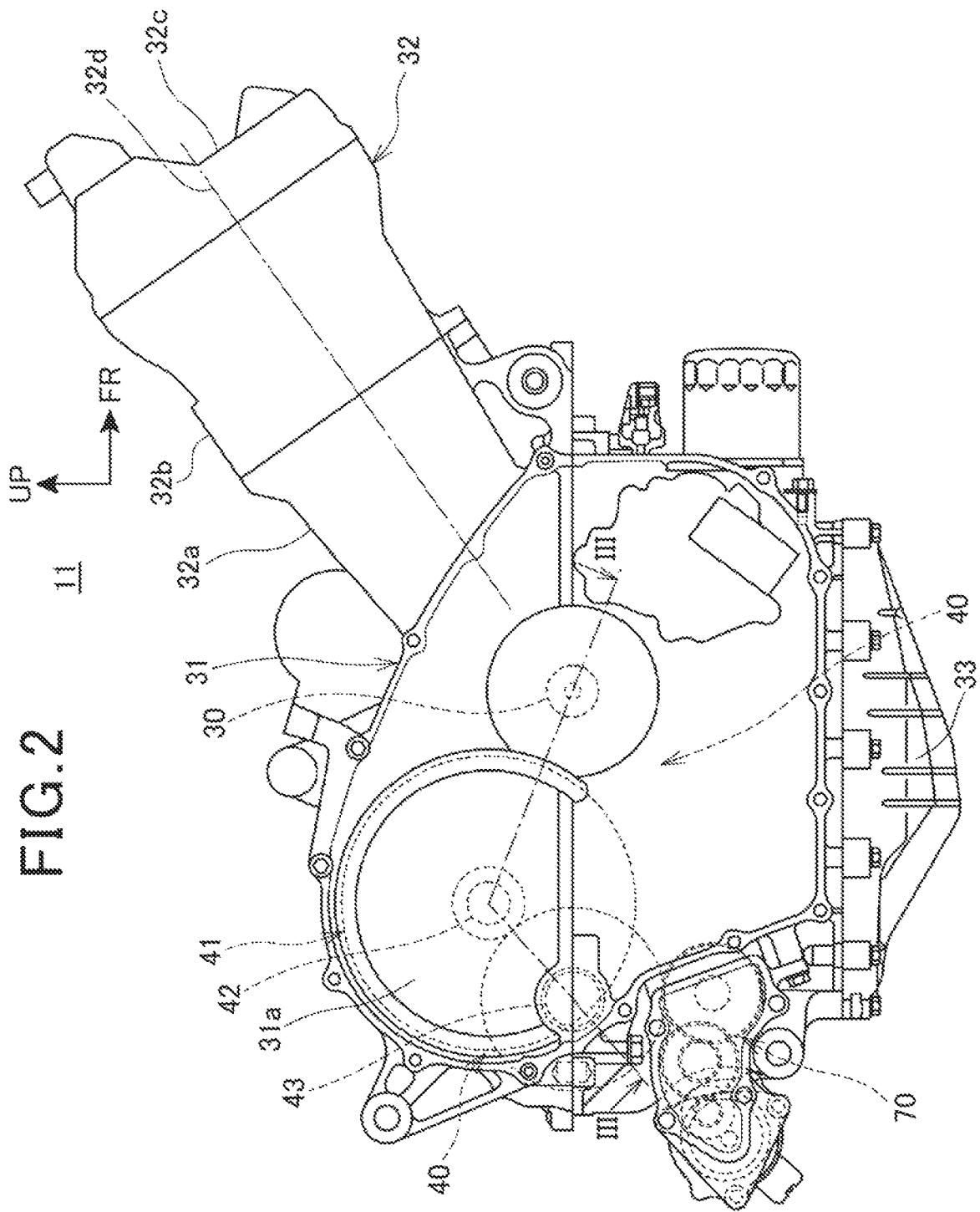
FIG. 2 is a right side view of an engine.

FIG. 2 is a right side view of the engine 11.

With reference to FIG. 1 and FIG. 2, the engine 11 as an internal combustion engine includes a crankcase 31 and a cylinder unit 32. The crankcase 31 supports a crankshaft 30 that horizontally extends in the vehicle width direction (left-right direction). The cylinder unit 32 extends upward from an upper surface of a front portion of the crankcase 31.

The cylinder unit 32 includes a cylinder 32a that houses a piston (not illustrated), a cylinder head 32b, and a head cover 32c in the order from the crankcase 31 side. The cylinder 32a has an axis 32d inclined forward with respect to a vertical direction.

An oil pan 33 is mounted on a lower surface of the crankcase.

An exhaust pipe 34 of the engine 11 is extracted downward from an exhaust port on a lower surface of the cylinder head 32b and extends rearward.

Figure 3:
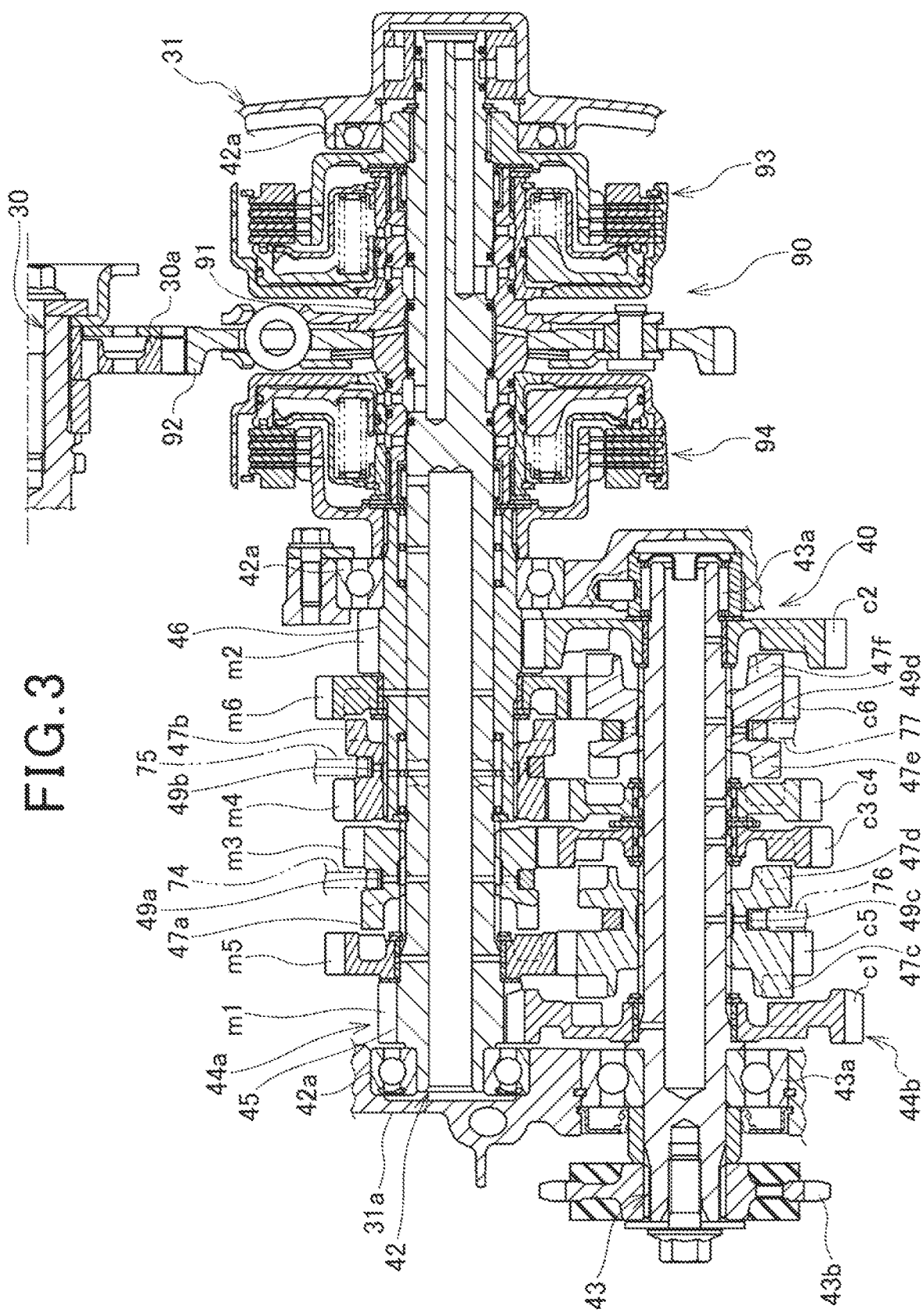
FIG. 3 is a cross-sectional view taken along III-III in FIG. 2.

FIG. 3 is a cross-sectional view taken along III-III of FIG. 2.

With reference to FIG. 2 and FIG. 3, the engine 11 includes a transmission 40. The transmission 40 shifts a rotation of the crankshaft 30 and outputs the rotation to the rear wheel 3 side as a driving wheel.

The transmission 40 includes a transmission unit 41 constituting a plurality of shift positions, a shift drive mechanism 70 that manipulates the shift position of the transmission unit 41, a clutch mechanism 90 that switches transmission of power between the crankshaft 30 and the transmission unit 41, and the control unit 35.

A transmission unit case portion 31a in which the transmission unit 41, the shift drive mechanism 70, and the clutch mechanism 90 are disposed is disposed on a rear portion of the crankcase 31 and at the rear of the crankshaft 30.

The transmission unit 41 includes a main shaft 42 and a counter shaft 43 arranged back and forth, a driving gear group 44a disposed on an outer periphery of the main shaft 42, and a driven gear group 44b disposed on the outer periphery of the counter shaft 43. The transmission unit 41 is a transmission unit of a constant mesh type in which the driving gear group 44a constantly meshes with the driven gear group 44b.

The main shaft 42 and the counter shaft 43 are disposed parallel to the crankshaft 30.

With reference to FIG. 3, the main shaft 42 is rotatably supported to the crankcase 31 via a plurality of bearings 42a.

The counter shaft 43 is rotatably supported to the crankcase 31 via bearings 43a disposed on both ends.

The main shaft 42 includes an inner shaft 45 and a tubular outer shaft 46 fitted to an outer periphery of the inner shaft 45.

The outer shaft 46 coaxially disposed with the inner shaft 45 and is relatively rotatable with respect to the inner shaft 45.

The outer shaft 46 has an overall length shorter than the inner shaft 45 and is disposed on the intermediate portion in an axis direction of the main shaft 42.

The driving gear group 44a includes a first speed driving gear m1, a second speed driving gear m2, a third speed driving gear m3, a fourth speed driving gear m4, a fifth speed driving gear m5, and a sixth speed driving gear m6.

In the driving gear group 44a, the first speed driving gear m1, the fifth speed driving gear m5, the third speed driving gear m3, the fourth speed driving gear m4, the sixth speed driving gear m6, and the second speed driving gear m2 are disposed in the order from one end side (left side) of the main shaft 42.

The first speed driving gear m1, the fifth speed driving gear m5, and the third speed driving gear m3 corresponding to the shift positions of the odd positions are disposed on the inner shaft 45.

The fourth speed driving gear m4, the sixth speed driving gear m6, and the second speed driving gear m2 corresponding to the shift positions of even shift positions are disposed on the outer shaft 46.

The driven gear group 44b includes a first speed driven gear c1 meshing with the first speed driving gear m1, a fifth speed driven gear c5 meshing with the fifth speed driving gear m5, a third speed driven gear c3 meshing with the third speed driving gear m3, a fourth speed driven gear c4 meshing with the fourth speed driving gear m4, a sixth speed driven gear c6 meshing with the sixth speed driving gear m6, and a second speed driven gear c2 meshing with the second speed driving gear m2 in the order from the one end side (left side) of the counter shaft 43.

The first speed driving gear m1 is a fixed gear formed integrally on the inner shaft 45 and rotating integrally with the inner shaft 45. The second speed driving gear m2 is a fixed gear formed integrally on the outer shaft 46 and rotating integrally with the outer shaft 46.

The fifth speed driving gear m5 is a free gear disposed relatively rotatable to the inner shaft 45 and unmovable in the axis direction.

The sixth speed driving gear m6 is a free gear disposed relatively rotatable to the outer shaft 46 and unmovable in the axis direction.

The first speed driven gear c1, the third speed driven gear c3, the fourth speed driven gear c4, and the second speed driven gear c2 are free gears disposed relatively rotatable to the counter shaft 43 and unmovable in the axis direction.

The third speed driving gear m3 is a shifter gear relatively unrotatable to the inner shaft 45 and movable in the axis direction. The third speed driving gear m3 includes dog teeth 47a configured to engage with a side surface of the fifth speed driving gear m5. Additionally, a groove 49a engaged with a shifter 74 that axially moves the third speed driving gear m3 is disposed on the outer periphery of the third speed driving gear m3.

The fourth speed driving gear m4 is a shifter gear relatively unrotatable to the outer shaft 46 and movable in the axis direction. The fourth speed driving gear m4 includes dog teeth 47b configured to engage with a side surface of the sixth speed driving gear m6. Additionally, a groove 49b engaged with a shifter 75 that axially moves the fourth speed driving gear m4 is disposed on the outer periphery of the fourth speed driving gear m4.

The fifth speed driven gear c5 and the sixth speed driven gear c6 are shifter gears relatively unrotatable to the counter shaft 43 and movable in the axis direction.

The fifth speed driven gear c5 includes dog teeth 47c configured to engage with a side surface of the first speed driven gear c1 and dog teeth 47d configured to engage with a side surface of the third speed driven gear c3. Additionally, a groove 49c engaged with a shifter 76 that axially moves the fifth speed driven gear c5 is disposed on the outer periphery of the fifth speed driven gear c5.

The sixth speed driven gear c6 includes dog teeth 47e configured to engage with a side surface of the fourth speed driven gear c4 and dog teeth 47f configured to engage with a side surface of the second speed driven gear c2. Additionally, a groove 49d engaged with a shifter 77 that axially moves the sixth speed driven gear c6 is disposed on the outer periphery of the sixth speed driven gear c6.

In the state illustrated in FIG. 3, the shift position of the transmission unit 41 is in a neutral state (neutral position), and all of the fifth speed driving gear m5, the sixth speed driving gear m6, the first speed driven gear c1, the third speed driven gear c3, the fourth speed driven gear c4, or the second speed driven gear c2, which is the free gear, is not fixed on the main shaft 42 or the counter shaft 43 and is relatively rotatable to the main shaft 42 and the counter shaft 43.

In the neutral state, even when the main shaft 42 rotates, the driven gear group 44b merely idles to the driving gear group 44a and the rotation of the main shaft 42 is not transmitted to the counter shaft 43.

In the neutral state, when the fifth speed driven gear c5 moves and the dog teeth 47c engage with the first speed driven gear c1, the first speed driven gear c1 is fixed to the counter shaft 43 and a first speed position is established.

In the neutral state, when the sixth speed driven gear c6 moves and the dog teeth 47f engage with the second speed driven gear c2, the second speed driven gear c2 is fixed to the counter shaft 43 and a second speed position is established.

In the neutral state, when the fifth speed driven gear c5 moves and the dog teeth 47d engage with the third speed driven gear c3, the third speed driven gear c3 is fixed to the counter shaft 43 and a third speed position is established.

In the neutral state, when the sixth speed driven gear c6 moves and the dog teeth 47e engage with the fourth speed driven gear c4, the fourth speed driven gear c4 is fixed to the counter shaft 43 and a fourth speed position is established.

In the neutral state, when the third speed driving gear m3 moves and the dog teeth 47a engage with the fifth speed driving gear m5, the fifth speed driving gear m5 is fixed to the inner shaft 45 and a fifth speed position is established.

In the neutral state, when the fourth speed driving gear m4 move and the dog teeth 47b engage with the sixth speed driving gear m6, the sixth speed driving gear m6 is fixed to the outer shaft 46 and a sixth speed position is established.

A drive sprocket 43b is disposed on a shaft end of the counter shaft 43. Driving force of the engine 11 is transmitted to the rear wheel 3 via a driving chain 50 (FIG. 1) bridged between the drive sprocket 43b and the rear wheel 3.

The clutch mechanism 90 is disposed on the main shaft 42. The clutch mechanism 90 is disposed on a side opposite to the first speed driving gear m1, the fifth speed driving gear m5, and the third speed driving gear m3, which are the odd positions, between which the outer shaft 46 is interposed in the axis direction of the main shaft 42.

The clutch mechanism 90 includes a tubular clutch shaft 91 fitted to the outer periphery of the inner shaft 45 of the main shaft 42, a primary driven gear 92 fixed on the clutch shaft 91, a first clutch 93 that connects and disconnects the transmission of power between the crankshaft 30 and the inner shaft 45, and a second clutch 94 that connects and disconnects transmission of power between the crankshaft 30 and the outer shaft 46.

The clutch shaft 91 is coaxially disposed with the inner shaft 45 and is relatively rotatable to the inner shaft 45.

A primary drive gear 30a disposed on the crankshaft 30 meshes with the primary driven gear 92. The clutch shaft 91 is rotated by the crankshaft 30 via the primary driven gear 92.

The second clutch 94 is a frictional hydraulic pressure clutch disposed across the clutch shaft 91 and the outer shaft 46.

The first clutch 93 is a frictional hydraulic pressure clutch disposed across the clutch shaft 91 and the inner shaft 45.

The first clutch 93 and the second clutch 94 are manipulated independently of one another by hydraulic pressure supplied by control by the control unit 35.

When the first clutch 93 is connected, the clutch shaft 91 integrally rotates with the inner shaft 45, and thus the transmission of the power from the inner shaft 45 to the counter shaft 43 becomes possible.

When the second clutch 94 is connected, the clutch shaft 91 rotates integrally with the outer shaft 46, and thus the transmission of the power from the outer shaft 46 to the counter shaft 43 becomes possible.

That is, the transmission 40 includes one system that transmits the power by any of the odd positions, which are the first speed position, the third speed position, and the fifth speed position, via the first clutch 93 and the inner shaft 45, and another system that transmits the power by any of the even positions, which are the second speed position, the fourth speed position, and the sixth speed position, via the second clutch 94 and the outer shaft 46, and performs shift so as to switch the systems in alternation.

Figure 4:
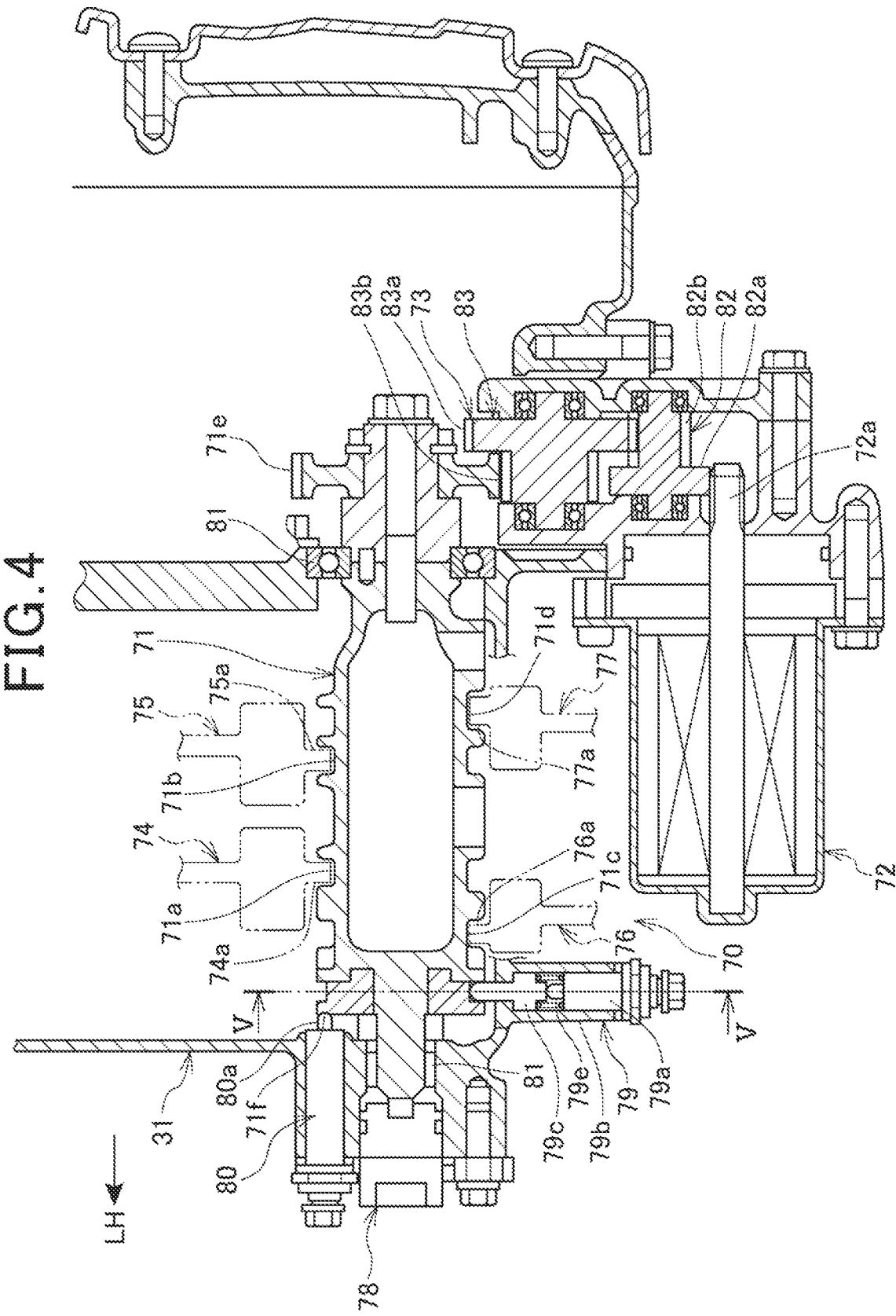
FIG. 4 is a cross-sectional view illustrating a shift drive mechanism.

FIG. 4 is a cross-sectional view illustrating the shift drive mechanism 70.

The shift drive mechanism 70 includes a shift drum 71 that rotates, an actuator 72 that rotatably drives the shift drum 71, a deceleration gear unit 73 that decelerates the rotation of the actuator 72 and transmits the rotation to the shift drum 71, and the shifters 74 to 77.

The shift drive mechanism 70 includes an angular sensor 78 that detects the rotation of the shift drum 71, a position sensor 79 that detects that the shift drum 71 is at a predetermined rotation angle, and a neutral sensor 80 that detects that the shift drum 71 is at a position corresponding to the neutral state.

The shift drum 71 is rotatably supported to the crankcase 31 via a plurality of bearings 81. The shift drum 71 is a shaft-shaped member long in the vehicle width direction and is disposed parallel to the main shaft 42 and the counter shaft 43.

On the outer periphery of the shift drum 71, a first lead groove 71a engaged with the shifter 74, a second lead groove 71b (lead groove) engaged with the shifter 75, a third lead groove 71c engaged with the shifter 76, and a fourth lead groove 71d engaged with the shifter 77 are disposed.

An input gear 71e is disposed on one end portion in the axis direction of the shift drum 71.

The actuator 72 is an electric motor rotatively driven by control by the control unit 35. A rotation shaft 72a of the actuator 72 is disposed parallel to the shift drum 71. The actuator 72 is supported to the crankcase 31.

The deceleration gear unit 73 includes a first gear shaft 82 and a second gear shaft 83 and is supported to the crankcase 31. The first gear shaft 82 and the second gear shaft 83 rotate around an axis parallel to the rotation shaft 72a of the actuator 72.

The first gear shaft 82 includes a large-diameter gear 82a meshing with the rotation shaft 72a of the actuator 72 and a small-diameter gear 82b having a diameter smaller than that of the large-diameter gear 82a.

The second gear shaft 83 includes a large-diameter gear 83a meshing with the small-diameter gear 82b and a small-diameter gear 83b having a diameter smaller than that of the large-diameter gear 83a and meshing with the input gear 71e of the shift drum 71.

The shifters 74 to 77 are supported to a guide shaft (not illustrated) extending parallel to the shift drum 71 and are slidable in the axis direction of the shift drum 71 along this guide shaft.

The shifter 74 engages with the first lead groove 71a via a pin portion 74a disposed on its one end portion and has an other end portion 74b engaging with the groove 49a (FIG. 3) of the third speed driving gear m3.

The shifter 75 engages with the second lead groove 71b via a pin portion 75a disposed on its one end portion and has an other end portion 75b engaging with the groove 49b (FIG. 3) of the fourth speed driving gear m4.

The shifter 76 engages with the third lead groove 71c via a pin portion 76a disposed on its one end portion and has an other end portion 76b engaging with the groove 49c (FIG. 3) of the fifth speed driven gear c5.

The shifter 77 engages with the fourth lead groove 71d via a pin portion 77a disposed on its one end portion and has an other end portion 77b engaging with the groove 49d (FIG. 3) of the sixth speed driven gear c6.

The rotation of the shift drum 71 by the actuator 72 slides the shifters 74 to 77 along patterns of the first lead groove 71a, the second lead groove 71b, the third lead groove 71c, and the fourth lead groove 71d via the pin portions 74a, 75a, 76a, and 77a, respectively.

This moves each of the third speed driving gear m3, the fourth speed driving gear m4, the fifth speed driven gear c5, and the sixth speed driven gear c6 as the shifter gears in the axis direction of the shift drum 71 and shifts the shift position of the transmission unit 41.

The neutral sensor 80 includes a detection rod 80a configured to stroke on its distal end portion. The neutral sensor 80 is a switch that detects a state that the detection rod 80a projects and a state that the detection rod 80a is pushed, and outputs the detection result to the control unit 35.

The shift drum 71 has one recess 71f configured to engage with the detection rod 80a on its end surface in the axis direction.

In a case where the shift drum 71 is at the rotation angle corresponding to the neutral state, the detection rod 80a projects and engages with the recess 71f. In a case where the shift drum 71 is not at the rotation angle corresponding to the neutral state, the detection rod 80a is in the state of being pushed.

Figure 5:
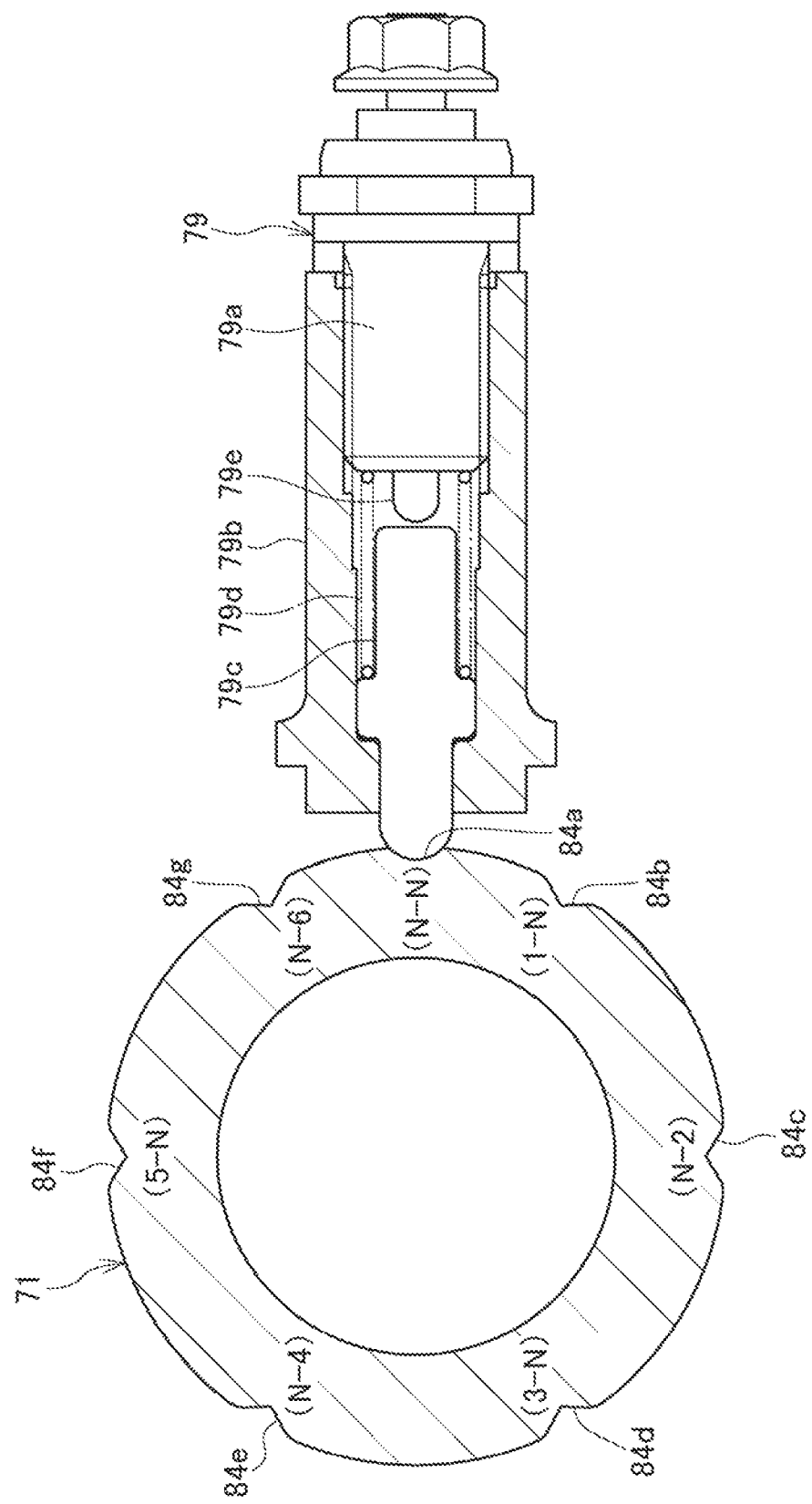
FIG. 5 is a cross-sectional view taken along V-V in FIG. 4.

FIG. 5 is a cross-sectional view taken along V-V in FIG. 4.

With reference to FIG. 4 and FIG. 5, the position sensor 79 includes a sensor body 79a, a tubular case 79b mounted on the sensor body 79a, a shaft-shaped probe 79c housed in the case 79b, and a biasing member 79d that biases the probe 79c. The sensor body 79a includes a strokable shaft-shaped detection unit 79e on its distal end portion.

The probe 79c is housed in the tube of the case 79b, and a distal end portion of the probe 79c projects outside of the case 79b from a hole in a distal end portion of the case 79b.

The sensor body 79a is a switch that detects a state that the detection unit 79e projects and a state that the detection unit 79e is pushed, and outputs the detection result to the control unit 35. In detail, the sensor body 79a is a switch that outputs off while the detection unit 79e projects and outputs on while the detection unit 79e is pushed.

The detection unit 79e abuts on a base end portion of the probe 79c in the tube of the case 79b and abuts on the shift drum 71 via the probe 79c.

The biasing member 79d is a coil spring disposed inside the tube of the case 79b. The biasing member 79d is compressed between the probe 79c and the sensor body 79a to bias the probe 79c such that the probe 79c projects from the case 79b.

The position sensor 79 is disposed in a direction in which the distal end of the probe 79c is opposed to the outer periphery of the shift drum 71.

On the outer periphery of the shift drum 71, as recesses configured to engage with the probe 79c, a neutral recess 84a, a first recess 84b, a second recess 84c, a third recess 84d, a fourth recess 84e, a fifth recess 84f, and a sixth recess 84g are disposed.

In a case where the shift drum 71 is at the rotation angle corresponding to the neutral state, the probe 79c projects to engage with the neutral recess 84a.

In a case where the shift drum 71 is at the rotation angle corresponding to the first speed position, the probe 79c projects to engage with the first recess 84b.

In a case where the shift drum 71 is at the rotation angle corresponding to the second speed position, the probe 79c projects to engage with the second recess 84c.

In a case where the shift drum 71 is at the rotation angle corresponding to the third speed position, the probe 79c projects to engage with the third recess 84d.

In a case where the shift drum 71 is at the rotation angle corresponding to the fourth speed position, the probe 79c projects to engage with the fourth recess 84e.

In a case where the shift drum 71 is at the rotation angle corresponding to the fifth speed position, the probe 79c projects to engage with the fifth recess 84f.

In a case where the shift drum 71 is at the rotation angle corresponding to the sixth speed position, the probe 79c projects to engage with the sixth recess 84g.

In the state where the probe 79c projects like FIG. 5, the detection unit 79e of the sensor body 79a also projects.

In the case where the shift drum 71 does not engage with any of the neutral recess 84a, the first recess 84b, the second recess 84c, the third recess 84d, the fourth recess 84e, the fifth recess 84f, or the sixth recess 84g, the probe 79c is pushed by the outer periphery of the shift drum 71. In the state, the detection unit 79e of the sensor body 79a is also pushed.

Since the position sensor 79 engages with the shift drum 71 via the probe 79c, the detection unit 79e of the sensor body 79a does not directly contact the outer periphery of the shift drum 71. This allows suppressing abrasion of the detection unit 79e.

The angular sensor 78 is disposed on an end portion on a side opposite to an end portion on a side where the input gear 71e is disposed on the shift drum 71 so as to be opposed.

The angular sensor 78 detects the rotation of the shift drum 71 and outputs the detection result to the control unit 35 as an output value.

Figure 6:
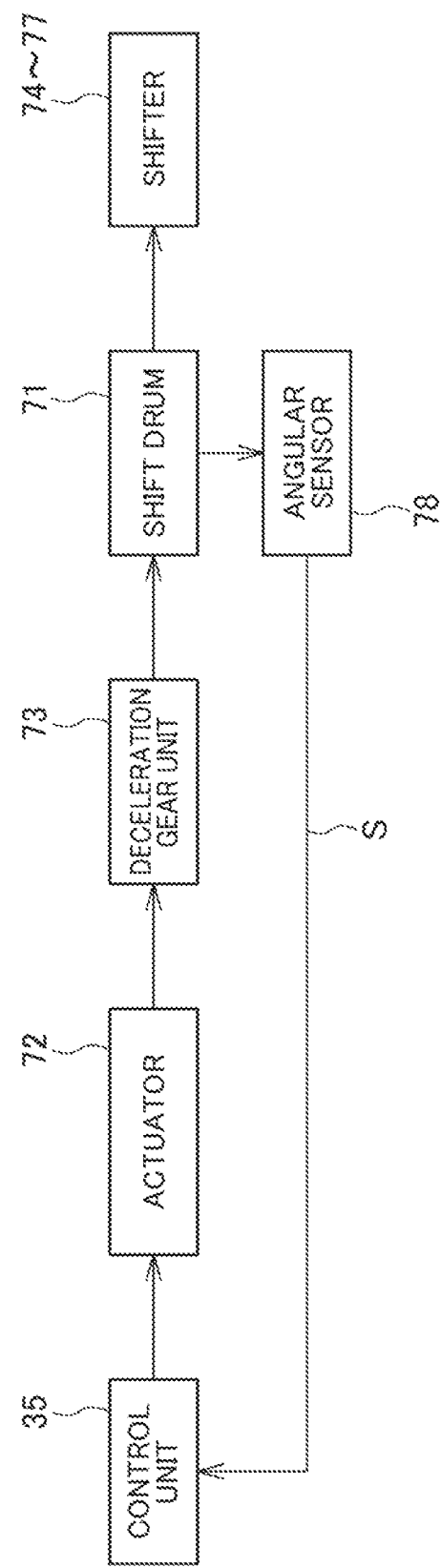
FIG. 6 is a block diagram illustrating the shift drive mechanism.

FIG. 6 is a block diagram illustrating the shift drive mechanism 70.

The control unit 35 controls electric power supplied to the actuator 72 to drive the rotation shaft 72a. The rotation of the rotation shaft 72a is decelerated by the deceleration gear unit 73 and transmitted to the shift drum 71, and the rotation of the shift drum 71 drives the shifters 74 to 77.

The control unit 35 performs feedback control on the actuator 72 based on an output value S from the angular sensor 78 to position the shift drum 71 at a target rotation angle.

The angular sensor 78 outputs a voltage according to the rotation angle of the shift drum 71 as the output value S.

The control unit 35 includes a calculation unit (not illustrated) and a storage unit (not illustrated). The calculation unit is a processor, such as a CPU. The control unit 35 executes a program stored by the storage unit to control the transmission 40. The storage unit is a non-volatile storage device, such as a flash ROM and an EEPROM, that stores the program executed by the calculation unit, data processed by the calculation unit, and the like.

The shift drive mechanism 70 directly rotates the shift drum 71 by the rotation of the actuator 72 and causes the shift drum 71 to highly accurately position at the target rotation angle by feedback control. In view of this, the shift drive mechanism 70 does not include a mechanism that has been conventionally used often for intermittent rotation of the shift drum 71 by, for example, a star-shaped cam.

The actuator 72 in a state where the electric power is not supplied provides a comparatively large cogging torque. When the shift drum 71 is in a state of being positioned at the target rotation angle, for example, the neutral state or the state in which the first speed position is established, the rotation of the shift drum 71 is restricted by the cogging torque of the actuator 72 acting on the shift drum 71 via the deceleration gear unit 73. Accordingly, the transmission unit 41 is maintained in the state where the predetermined shift position is established.

Figure 7:
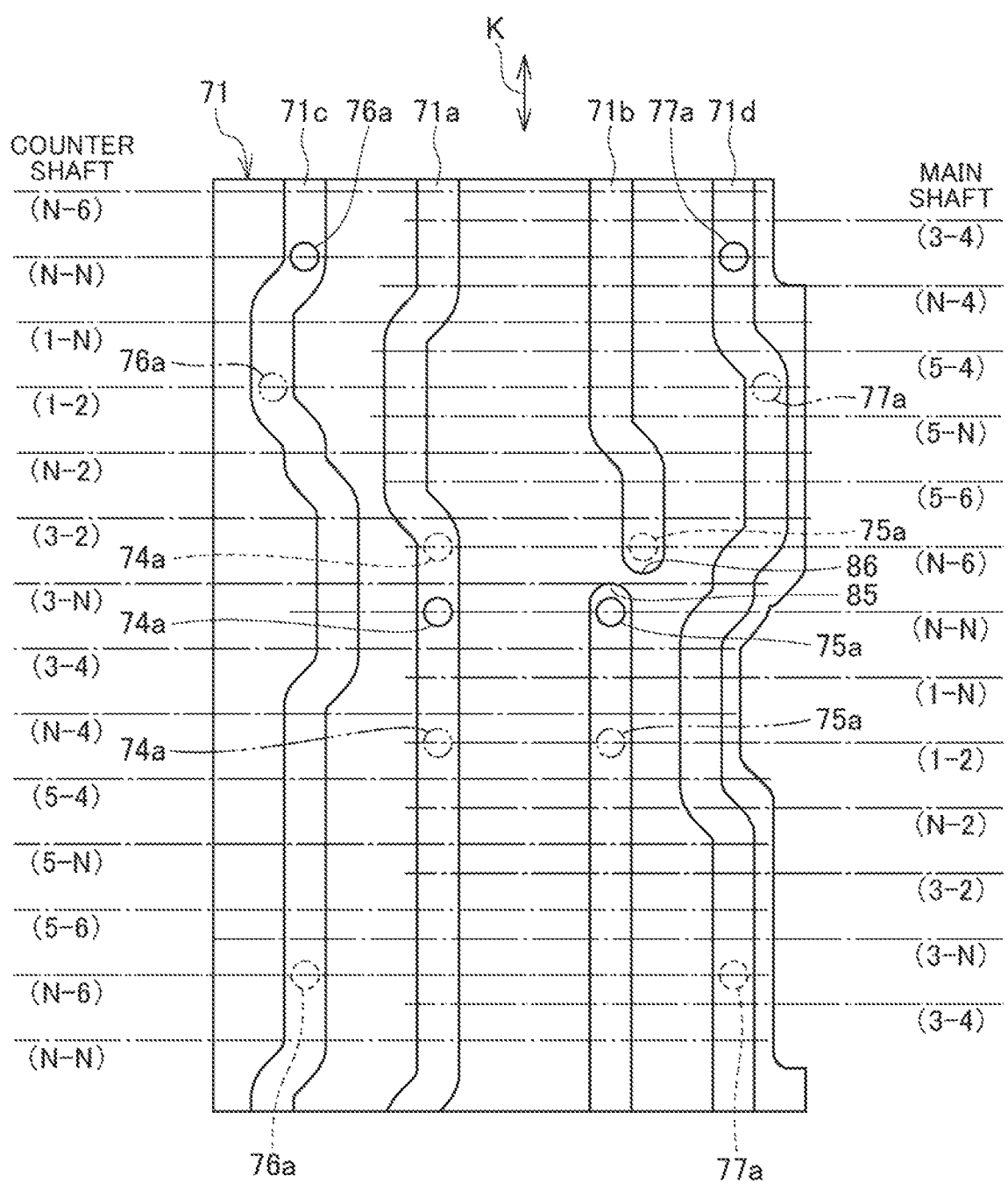
FIG. 7 is a drawing that develops a first lead groove, a second lead groove, a third lead groove, and a fourth lead groove in a rotation direction of a shift drum.

FIG. 7 is a drawing developing the first lead groove 71a, the second lead groove 71b, the third lead groove 71c, and the fourth lead groove 71d in a rotation direction K of the shift drum 71.

The first lead groove 71a, the second lead groove 71b, the third lead groove 71c, and the fourth lead groove 71d are long grooves extending in the rotation direction K while partially shifting to the right and left.

The first lead groove 71a, the third lead groove 71c, and the fourth lead groove 71d are endless grooves that round the outer periphery of the shift drum 71.

The second lead groove 71b is a groove having an end wall 85 and an end wall 86 on both ends in the rotation direction K and does not round the outer periphery of the shift drum 71.

The first lead groove 71a and the second lead groove 71b engaged with the shifters 74, 75 for the main shaft 42, respectively, are positioned aligned at the left and right at the center in FIG. 7.

The third lead groove 71c and the fourth lead groove 71d engaged with the shifters 76, 77 for the counter shaft 43, respectively, are positioned aligned at the left and right ends in FIG. 7.

In FIG. 7, a sign, such as (N-N), indicative of the position of the shift drum 71 is denoted corresponding to each of the main shaft 42 and the counter shaft 43.

The left sign in the parentheses of FIG. 7 indicates the shift position of the odd position, and the right sign in the parentheses of FIG. 7 indicates the shift position of the even position.

The neutral state is established at the (N-N) position.

At the (1-N), (N-2), (3-N), (N-4), (5-N), and (N-6) positions, the first speed position to the sixth speed position are established, respectively.

The rotation of the shift drum 71 from the (N-N) position establishes the first speed position to the sixth speed position in order.

The (N-N) position corresponding to the neutral state is a position at the lowest position of the shift, and the (N-6) position corresponding to the sixth speed position is a position at the uppermost position of the shift.

For example, as indicated by the solid lines in FIG. 7, when the shifters 74 to 77 are positioned at the (N-N) position, the third speed driving gear m3 and the fourth speed driving gear m4 disposed on the main shaft 42 are in the neutral state. Additionally, in the state, the fifth speed driven gear c5 and the sixth speed driven gear c6 disposed on the counter shaft 43 are in the neutral state.

Additionally, for example, as indicated by the dashed line in FIG. 7, when the shifters 74 to 77 are positioned at the (N-6) position, the third speed driving gear m3 on the main shaft 42 is at the position identical to that in the neutral state, and the fourth speed driving gear m4 on the main shaft 42 moves to the right side to establish the sixth speed position and is in the state of engaging with the sixth speed driving gear m6. Further, in the state, the fifth speed driven gear c5 and the sixth speed driven gear c6 disposed on the counter shaft 43 are at the position identical to that in the neutral state.

The shift drum 71 has a plurality of intermediate positions to position the shifters 74 to 77 at a position different from that before the shift and after the shift while the shift position is shifted by one position.

FIG. 7 indicates the respective intermediate positions by (1-2), (3-2), (3-4), (5-4), and (5-6).

For example, as indicated by the imaginary lines in FIG. 7, while the shifters 74 to 77 are positioned at the (1-2) position, the transmission unit 41 establishes the first speed position and the second speed position.

In this case, the third speed driving gear m3 and the fourth speed driving gear m4 disposed on the main shaft 42 are at the position identical to that in the neutral state. Additionally, the fifth speed driven gear c5 on the counter shaft 43 moves the left side to establish the first speed position and is in the state of engaging with the first speed driven gear c1, and the sixth speed driven gear c6 on the counter shaft 43 moves the right side to establish the second speed position and is in the state of engaging with the second speed driven gear c2.

During connection of the first clutch 93 at the (1-N) position and travelling at the first speed position, the control unit 35 drives the shift drive mechanism 70 to shift to the (1-2) position and form a pre-shift state in which both of the first speed position and the second speed position are established. In the state, the first clutch 93 is connected and the second clutch 94 is disconnected.

Afterwards, to shift up from the first speed position to the second speed position, the control unit 35 disconnects the first clutch 93 and connects the second clutch 94. Because only changing the connection states of the first clutch 93 and the second clutch 94 from the pre-shift state the allows the shift, thus ensuring the quick shift.

At the completion of the upshift to the second speed position, the control unit 35 drives the actuator 72 to shift the shift drum 71 to the (N-2) position.

Figure 8:
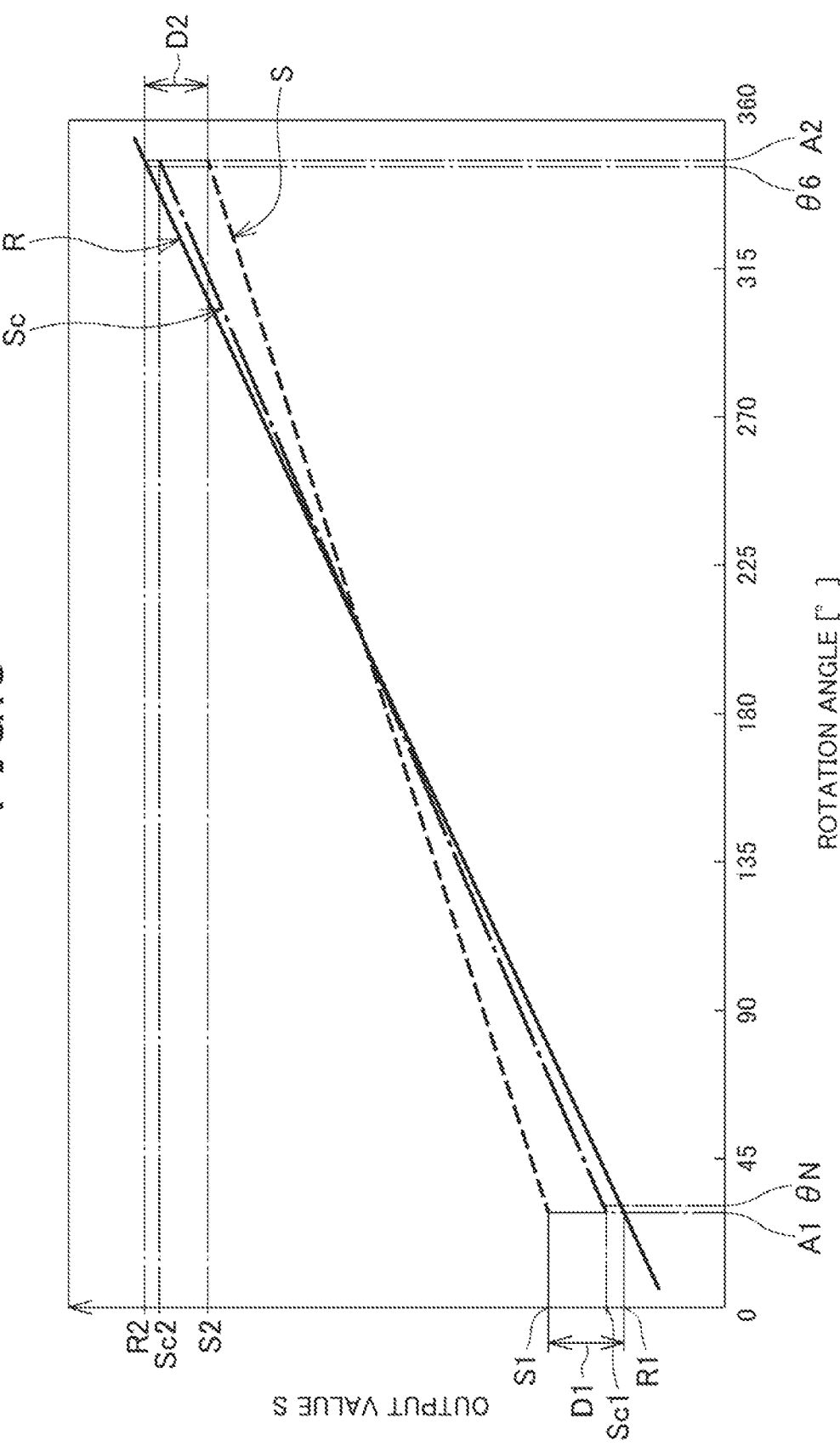
FIG. 8 is a table illustrating an output value from an angular sensor relative to the rotation angle of the shift drum.

FIG. 8 is a table illustrating the output value S from the angular sensor 78 relative to the rotation angle of the shift drum 71. FIG. 8 indicates the rotation angle of the shift drum 71 on the horizontal axis and indicates the output value S on the vertical axis.

The output value S from the angular sensor 78 increases as the rotation angle of the shift drum 71 increases. The output value S increases to be approximately directly proportional to the rotation angle of the shift drum 71. That is, the rotation angle of the shift drum 71 is linearly correlated with the output value S.

An increasing direction of the rotation angle of the shift drum 71 is the upshift direction in which the position number of the shift position increases. A decreasing direction of the rotation angle of the shift drum 71 is a downshift direction in which the position number of the shift position decreases.

The control unit 35 performs a correction process that corrects the output value S from the angular sensor 78.

The control unit 35 has a reference value R of the output value S from the angular sensor 78 to the rotation angle of the shift drum 71.

The reference value R is set across the whole region in a range in which the shift drum 71 is rotatable. The reference value R increases approximately directly proportional to the rotation angle of the shift drum 71. That is, the rotation angle of the shift drum 71 is linearly correlated with the reference value R, and the reference value R is represented by a straight line corresponding to the rotation angle of the shift drum 71.

Here, the reference value R is stored, for example, as a map in the control unit 35. Note that the reference value R may be a preset calculating formula or may be calculated by a combination of the calculating formula and the map.

In the correction process, the control unit 35 obtains a first output value S1 as the output value from the angular sensor 78 at a first rotation angle A1 of the shift drum 71 and a second output value S2 as the output value from the angular sensor 78 at a second rotation angle A2 of the shift drum 71.

The second rotation angle A2 is an angle different from the first rotation angle A1 and is greater than the first rotation angle A1.

The first rotation angle A1 is the closest to a turning angle θN of the shift drum 71 at the (N-N) position corresponding to the neutral state as the lowest position of the shift among the (N-N), (1-N), (N-2), (3-N), (N-4), (5-N), and (N-6) positions corresponding to the respective neutral state to sixth speed position.

The second rotation angle A2 is the closest to a turning angle θ6 of the shift drum 71 at the (N-6) position corresponding to the sixth speed position as the uppermost position of the shift among the (N-N), (1-N), (N-2), (3-N), (N-4), (5-N), and (N-6) positions corresponding to the respective neutral state to sixth speed position.

Figure 9:
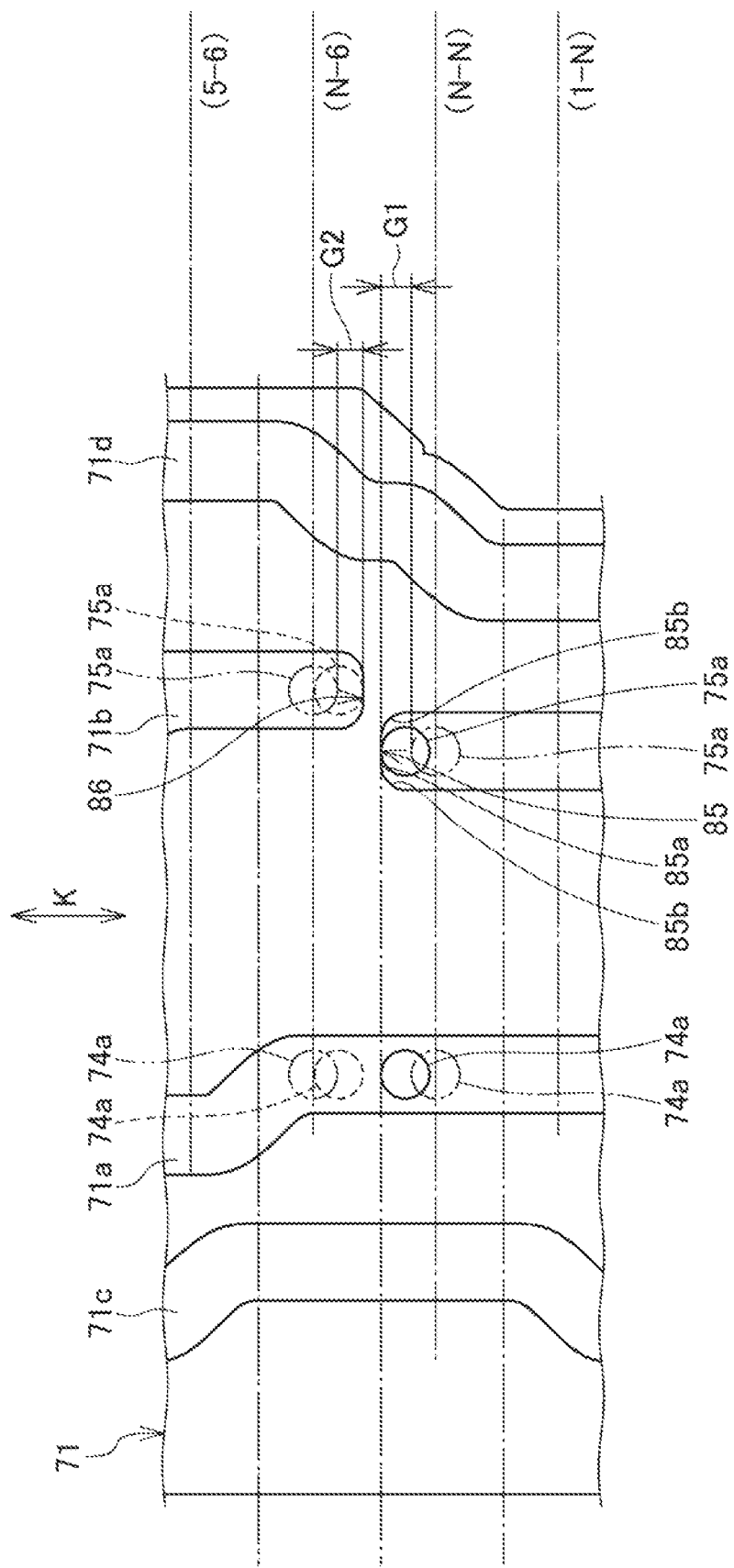
FIG. 9 is a drawing illustrating a positional relationship between the shift drum and a shifter when a correction process is performed.

FIG. 9 is a drawing illustrating a positional relationship between the shift drum 71 and the shifter 75 when the correction process is performed.

FIG. 9 indicates the pin portion 74a of the shifter 74 and the pin portion 75a of the shifter 75 in the state where the neutral state is established and the state where the sixth speed position is established by the imaginary lines.

With reference to FIG. 8 and FIG. 9, at the (N-N) position, one end wall 85 of the second lead groove 71b forms a clearance G1 with the pin portion 75a and the pin portion 75a does not abut on the end wall 85.

The first rotation angle A1 is the rotation angle of the shift drum 71 in a state where the pin portion 75a butts against the end wall 85.

That is, the shift drum 71 is further rotated to the downshift side to the turning angle θN (FIG. 8), and when the pin portion 75a butts against the end wall 85, the shift drum 71 is positioned at the first rotation angle A1.

Additionally, since the first lead groove 71a is the endless groove, even when the shift drum 71 is positioned at the first rotation angle A1, the pin portion 74a does not butt.

With reference to FIG. 8 and FIG. 9, at the (N-6) position, a clearance G2 is formed between the other end wall 86 of the second lead groove 71b and the pin portion 75a, and the pin portion 75a does not abut on the end wall 86.

The second rotation angle A2 is a rotation angle of the shift drum 71 in a state where the pin portion 75a butts against the end wall 86.

That is, the shift drum 71 is further rotated to the upshift side to the turning angle θ6 (FIG. 8), and when the pin portion 75a butts against the end wall 86, the shift drum 71 is positioned at the second rotation angle A2.

Additionally, since the first lead groove 71a the endless groove, even when the shift drum 71 is positioned at the second rotation angle A2, the pin portion 74a does not butt.

Figure 10:
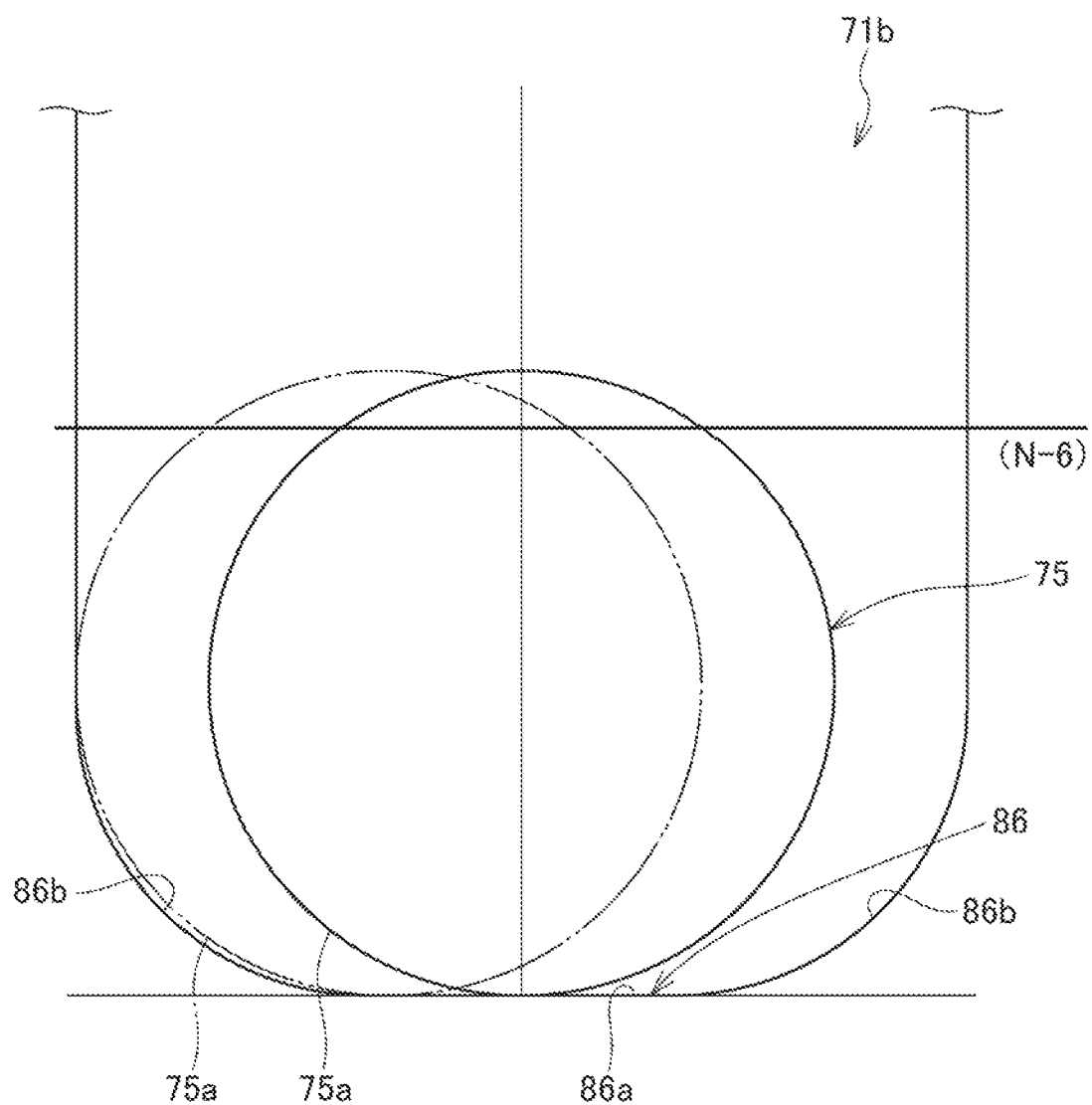
FIG. 10 is an enlarged view illustrating a butting state between a pin portion and an end wall.

FIG. 10 is an enlarged view illustrating the butting state between the pin portion 75a and the end wall 86.

The second lead groove 71b has a width formed to be larger than a diameter of the pin portion 75a such that the pin portion 75a is smoothly movable inside the second lead groove 71b. The pin portion 75a is an approximately circular-bar shape.

The end wall 86 has an abutment surface 86a abutting on the outer periphery of the pin portion 75a. The abutment surface 86a has a flat surface. The end wall 86 has curved surface portions 86b continuous with the abutment surfaces 86a on both ends in the width direction of the second lead groove 71b.

The abutment surface 86a is a straight line and a curvature of the abutment surface 86a is 0. That is, the curvature of the abutment surface 86a of the end wall 86 is smaller than a curvature of the outer periphery of the arc-shaped pin portion 75a.

Additionally, the curvature of the curved surface portion 86b is greater than the curvature of the outer periphery of the arc-shaped pin portion 75a.

As indicated by the imaginary line in FIG. 10, the abutment surface 86a is formed to have a size at which the outer periphery of the pin portion 75a can abut on the abutment surface 86a even when the pin portion 75a moves in the width direction of the second lead groove 71b in the second lead groove 71b.

Thus, the abutment surface 86a having the flat surface is disposed in the end wall 86 and the curvature of the curved surface portion 86b is greater than the curvature of the outer periphery of the pin portion 75a. This suppresses the butting of the pin portion 75a against the curved surface portion 86b and allows the pin portion 75a to butt against the end wall 86 with high accuracy.

Moreover, as illustrated in FIG. 9, the end wall 85 on the opposite side of the end wall 86 has an abutment surface 85a having the flat surface and a curved surface portion 85b similarly to the end wall 86. This suppresses the butting of the pin portion 75a against the curved surface portion 85b and allows the pin portion 75a to butt against the end wall 85 with high accuracy.

Figure 11:
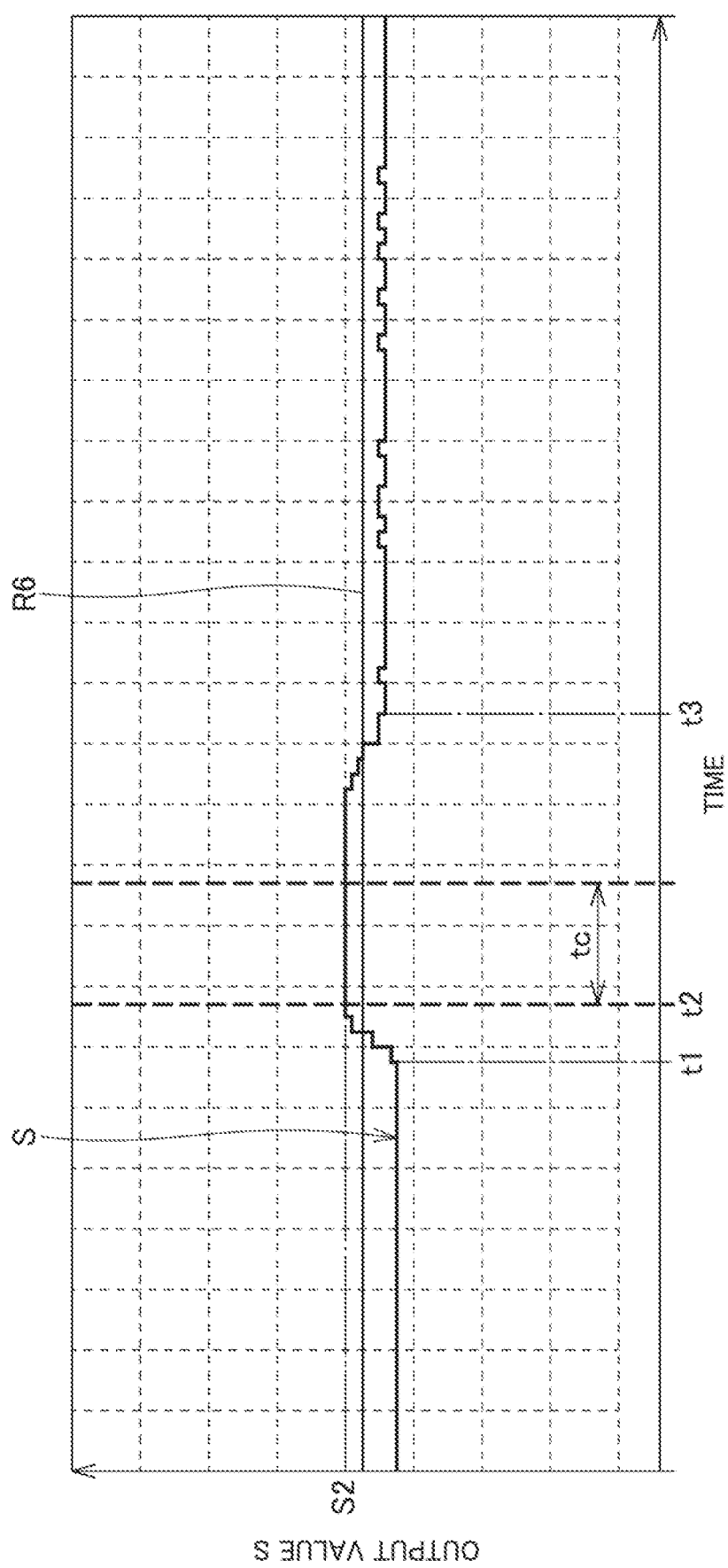
FIG. 11 is a table illustrating a change in output value from the angular sensor relative to a time passage when the correction process is performed.
Figure 12:
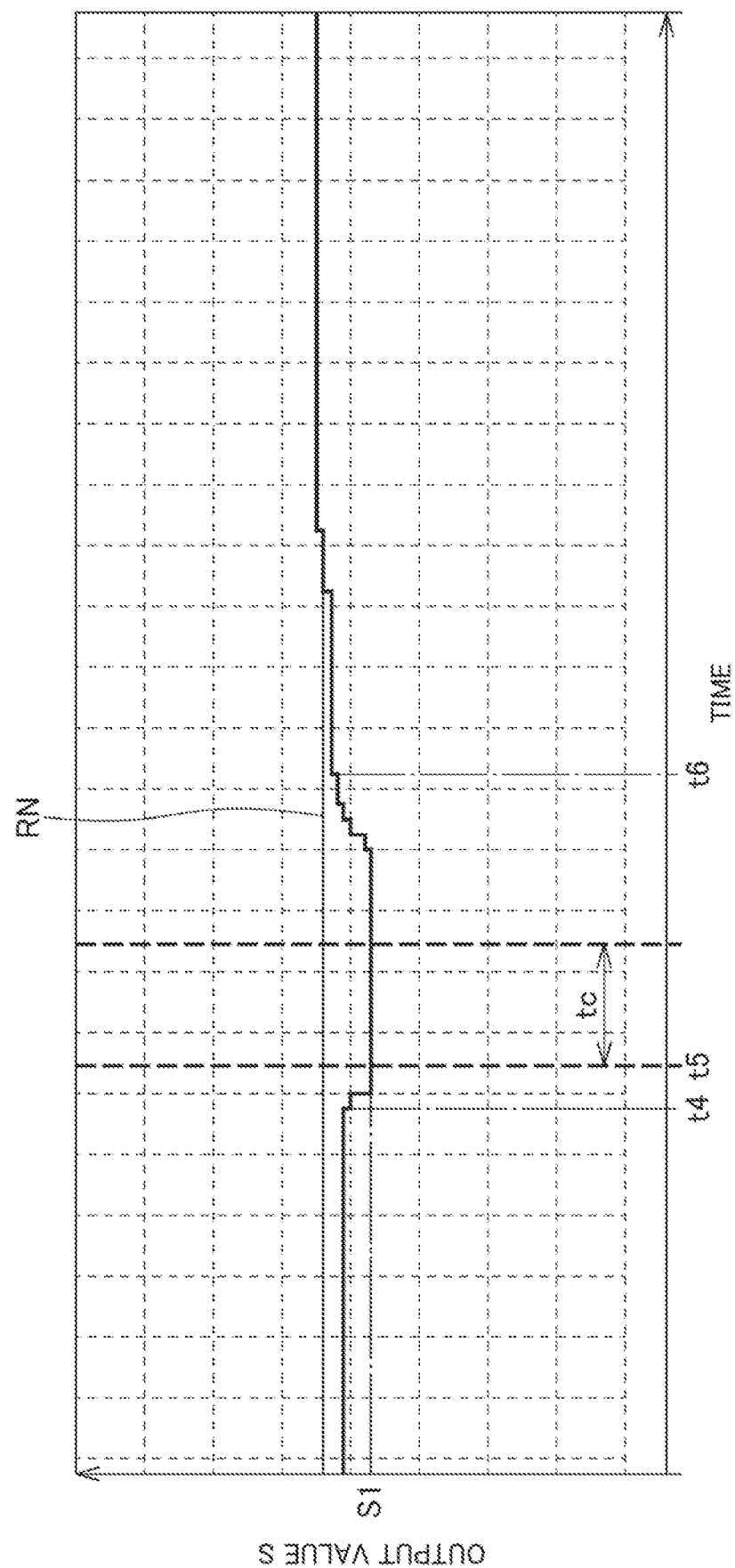
FIG. 12 is a table illustrating the change in output value from the angular sensor relative to the time passage when the correction process is performed.

FIG. 11 and FIG. 12 are tables illustrating a change in the output value S from the angular sensor 78 relative to a time passage when the correction process is performed. FIG. 11 illustrates the correction process on the sixth speed position side. FIG. 12 illustrates the correction process on the neutral state side.

In the correction process, the control unit 35 drives the actuator 72 and changes the shift drum 71 from the (N-N) position to (N-6).

Next, the control unit 35 further rotates the shift drum 71 from the (N-6) position to the upshift side and causes the pin portion 75a of the shifter 75 to butt against the end wall 86 of the second lead groove 71b. In detail, as illustrated in FIG. 11, the control unit 35 sends the shift drum 71 from the (N-6) position to the upshift side at a time t1 and the pin portion 75a butts against the end wall 86 at a time t2. The output value S increases from the time t1 until the time t2 in accordance with the rotation of the shift drum 71. When the pin portion 75a butts against the end wall 86, the output value S becomes approximately constant and hardly changes.

The control unit 35 detects the butting of the pin portion 75a against the end wall 86 based on the approximately constant change in the output value S. When the butting state continues for a predetermined time tc from the time t2, the control unit 35 determines completion of the butting and obtains the output value S at this time point as the second output value S2 (see FIG. 8 and FIG. 11) at the second rotation angle A2.

Next, the control unit 35 corrects the output value S of the second rotation angle A2, namely, the second output value S2 based on a difference D2 between the second output value S2 and the second reference value R2 as the reference value R at the second rotation angle A2. In detail, the control unit 35 corrects the second output value S2 such that the difference D2 decreases.

For example, as illustrated in FIG. 8, when the second output value S2 is smaller than the second reference value R2, the second output value S2 is corrected such that the value increases and becomes a corrected output value Sc2.

Afterwards, the control unit 35 returns the shifter 75 to the (N-6) position. At a time t3, in the state of becoming the (N-6) position, as illustrated in FIG. 11, the output value S approaches a value of a reference value R6 as the reference value R at the (N-6) position compared with that before the correction.

Subsequently, the control unit 35 drives the actuator 72 and changes the shift drum 71 from the (N-6) position to (N-N).

Next, the control unit 35 further rotates the shift drum 71 from the (N-N) position to the downshift side and causes the pin portion 75a of the shifter 75 to butt against the end wall 85 of the second lead groove 71b. In detail, as illustrated in FIG. 12, the control unit 35 sends the shift drum 71 from the (N-N) position to the downshift side at a time t4, and the pin portion 75a butts against the end wall 85 at a time t5. The output value S decreases from the time t4 until the time t5 in accordance with the rotation of the shift drum 71. When the pin portion 75a butts against the end wall 85, the output value S becomes approximately constant and hardly changes.

The control unit 35 detects the butting of the pin portion 75a against the end wall 85 based on the approximately constant change in the output value S. When the butting state continues for the predetermined time tc from the time t5, the control unit 35 determines completion of the butting and obtains the output value S at this time point as the first output value S1 (see FIG. 8 and FIG. 12) of the first rotation angle A1.

Next, the control unit 35 corrects the output value S of the first rotation angle A1, namely, the first output value S1 based on a difference D1 between the first output value S1 and the reference value R1 as the reference value R at the first rotation angle A1. In detail, the control unit 35 corrects the first output value S1 such that the difference D1 decreases.

For example, as illustrated in FIG. 8, when the first output value S1 is greater than the first reference value R1, the first output value S1 is corrected such that the value decreases and becomes a corrected output value Sc1.

Afterwards, the control unit 35 returns the shifter 75 to the (N-N) position. At a time t6, in the state of becoming the (N-N) position, as illustrated in FIG. 12, the output value S approaches a value of a reference value RN as the reference value R at the (N-N) position compared with that before the correction.

Furthermore, the control unit 35 corrects all output values S output at the rotation angles from the first rotation angle A1 to the second rotation angle A2 based on the difference D1 and the difference D2. That is, the output values S output at the rotation angles between the first rotation angle A1 and the second rotation angle A2 are corrected based on the difference D1 and the difference D2.

The corrected output value Sc obtained by the correction process is represented by the straight line connecting the corrected output value Sc1 and the corrected output value Sc2 in FIG. 8.

Since the corrected output value Sc is corrected by the two points, the corrected output value Sc1 and the corrected output value Sc2, an inclination of the straight line of the output value S represented in FIG. 8 can be corrected. As illustrated in FIG. 8, the inclination of the straight line of the corrected output value Sc becomes closer to an inclination of the straight line of the reference value R compared with an inclination of the straight line of the output value S before correction. In view of this, the rotation angle of the shift drum 71 can be highly accurately detected, and the shift can be properly performed by controlling the shift drive mechanism 70 based on the high-accurate rotation angle.

Figure 13:
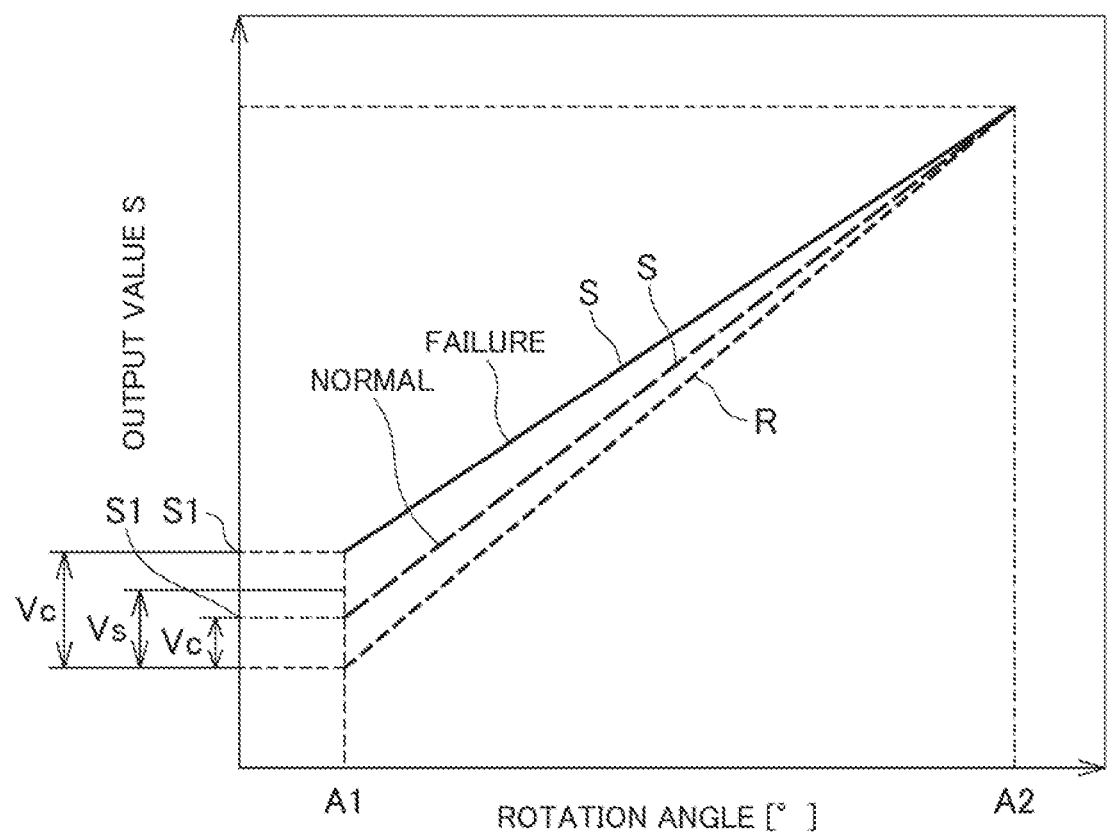
FIG. 13 is a table describing detection of a failure in the angular sensor based on the output value.

FIG. 13 is a table describing detection of a failure in the angular sensor 78 based on the output value S.

The control unit 35 determines the failure in the angular sensor 78 based on the difference between the reference value R and the output value S.

In detail, when a correction amount Vc of the first output value S1 of the first rotation angle A1 is larger than a predetermined value Vs in the correction process, the control unit 35 determines that the angular sensor 78 has a failure. When the correction amount Vc is the predetermined value Vs or less, the control unit 35 determines that the angular sensor 78 is normal.

Although not illustrated in FIG. 13, similarly to the correction amount Vc, when a correction amount of the second output value S2 of the second rotation angle A2 is larger than a predetermined value in the correction process, the control unit 35 determines that the angular sensor 78 has a failure. When the correction amount is the predetermined value or less, the control unit 35 determines that the angular sensor 78 is normal.

Additionally, the control unit 35 can determine the failure in the angular sensor 78 from the output from the position sensor 79 (FIG. 5), the output value S from the angular sensor 78, and the reference value R.

In detail, the control unit 35 detects that the shift drum 71 is in the neutral state and is positioned at the correct position of any of the positions of from the first speed position to the sixth speed position based on the output from the position sensor 79.

When the control unit 35 detects that the shift drum 71 is at the correct position described above, the control unit 35 obtains the output value S from the angular sensor 78 at the time point. The control unit 35 estimates that whether the shift position is in the neutral state and the shift position is at which shift position of from the first speed position to the sixth speed position from the output value S. Specifically, the control unit 35 compares the obtained output value S with the reference value R corresponding to each shift position and estimates that the current shift position is at the shift position corresponding to the reference value R with the value closest to the output value S.

Next, the control unit 35 calculates a difference between the output value S and the reference value R of the estimated shift position. When the difference exceeds the predetermined value, the control unit 35 determines that the angular sensor 78 has a failure.

When the control unit 35 estimates, for example, the current shift position is the third speed position, the control unit 35 performs determination on a failure in the angular sensor 78 from the difference between the obtained output value S and the reference value R of the third speed position.

As described above, according to the first embodiment to which the present invention is applied, the transmission 40 includes the shift drum 71, the angular sensor 78, and the control unit 35. The shift drum 71 is rotated by the actuator 72. The angular sensor 78 is configured to output the rotation of the shift drum 71 as the output value S. The control unit 35 is configured to calculate the rotation angle of the shift drum 71 from the output value S. The control unit 35 has the reference values R1, R2 as the reference values of the output values S at the first rotation angle A1 and the second rotation angle A2 of the shift drum 71. The second rotation angle A2 is different from the first rotation angle A1. The control unit 35 is configured to obtain the output values S at the first rotation angle A1 and the second rotation angle A2 as the first output value S1 and the second output value S2, respectively. The control unit 35 is configured to correct the output value S output at between the first rotation angle A1 and the second rotation angle A2 based on the difference D1 between the first output value S1 and the reference value R1 at the first rotation angle A1 and the difference D2 between the second output value S2 and the reference value R2 at the second rotation angle A2.

With this configuration, since the output value S of the shift drum 71 is corrected based on the plurality of values, which are the difference D1 between the first output value S1 and the first reference value R1 at the first rotation angle A1 and the difference D2 between the second output value S2 and the second reference value R2 at the second rotation angle A1, the rotation angle of the shift drum 71 can be highly accurately detected.

The rotation angle of the shift drum 71 is linearly correlated with the output value S from the angular sensor 78. The reference value R between the first rotation angle A1 and the second rotation angle A2 is represented by a straight line corresponding to the rotation angle.

With this configuration, since the output value S from the angular sensor 78 and the reference value R are the straight lines, the correction based on the plurality of values allows the correction of the inclination of the straight line of the output value S from the angular sensor 78 and allows highly accurate detection of the rotation angle of the shift drum 71.

The shift drum 71 has the positions corresponding to the respective shift positions. The first rotation angle A1 is the closest to the turning angle θN of the N-N position corresponding to the neutral state as the lowest position of the shift among the plurality of the positions. The second rotation angle A2 is the closest to the turning angle θ6 of the N-6 position corresponding to the sixth speed position as the uppermost position of the shift among the plurality of positions.

With this configuration, since the interval between the first rotation angle A1 and the second rotation angle A2 increases, the first output value S1 and the second output value S2 can be obtained in the range of the wide rotation angle. This allows highly accurate detection of the rotation angle of the shift drum 71.

The shift drum 71 includes the second lead groove 71b that extends in the rotation direction K of the shift drum 71. The shifter 75 that includes the pin portion 75a engaging with the second lead groove 71b is disposed. The shift is performed by moving the shifter 75 along the second lead groove 71b via the pin portion 75a. The second lead groove 71b has the end wall 85 and the end wall 86 on both ends in the rotation direction K of the shift drum 71. The first rotation angle A1 is the angle at which the pin portion 75a butts against the end wall 85. The second rotation angle A2 is the angle at which the pin portion 75a butts against the end wall 86.

With this configuration, the first output value S1 and the second output value S2 can be obtained at the angles at which the pin portion 75a butts against the end wall 85 and the end wall 86 of the second lead groove 71b. This allows highly accurately obtaining the first output value S1 and the second output value S2. In view of this, the output value S can be corrected after highly accurately identifying the rotation angle of the shift drum 71. This allows highly accurate detection of the rotation angle of the shift drum 71.

Additionally, the end wall 85 and the end wall 86 against which the pin portion 75a butts are disposed in the identical second lead groove 71b. This allows the pin portion 75a to butt against the second lead groove 71b with high accuracy and the rotation angle of the shift drum 71 can be identified with high accuracy.

The pin portion 75a has the columnar shape. The end wall 85 and the end wall 86 have the abutment surface 85a and the abutment surface 86a abutting on the outer periphery of the pin portion 75a. The abutment surfaces 85a and the abutment surface 86a have the curvature smaller than the curvature of the outer periphery of the pin portion 75a.

This configuration allows the pin portion 75a to correctly butt against the end wall 85 and the end wall 86 of the second lead groove 71b, and the first output value S1 and the second output value S2 can be obtained with high accuracy. This allows highly accurate detection of the rotation angle of the shift drum 71.

The abutment surface 85a and the abutment surface 86a are the flat surfaces.

This configuration allows the pin portion 75a to correctly butt against the end wall 85 and the end wall 86, and the first output value S1 and the second output value S2 can be obtained with high accuracy.

The curved surface portions 85b, 86b continuous with the abutment surfaces 85a, 86a are formed on both ends in the width direction of the second lead groove 71b. The curved surface portions 85b, 86b have the curvature larger than the curvature of the outer periphery of the pin portion 75a.

With this configuration, the abutment of the pin portion 75a on the curved surface portions 85b, 86b can be suppressed, and therefore, this allows suppressing an interference of the butting of the pin portion 75a against the abutment surfaces 85a and 86a by contact of the pin portion 75a with the curved surface portions 85b, 86b before the abutment on the abutment surface 86a.

The shift drum 71 is directly rotatively driven by the actuator 72 via the deceleration gear unit 73 disposed between the actuator 72 and the shift drum 71. The actuator 72 rotates the shift drum 71 by feedback control using the output value S.

With this configuration, since the correction allows the detection of the rotation angle of the shift drum 71 with high accuracy, the rotation of the shift drum 71 can be controlled with high accuracy in the configuration where the shift drum 71 is directly rotatably driven by the actuator 72.

Furthermore, when the correction amount Vc of the output value S exceeds the predetermined value Vs, the control unit 35 determines that the angular sensor 78 has a failure.

With this configuration, a failure in the angular sensor 78 can be determined by the simple method.

Second Embodiment

The following describes the second embodiment to which the present invention is applied. In the second embodiment, the same reference numerals are given to parts configured similarly to the first embodiment and the description thereof will be omitted.

The second embodiment differs from the first embodiment in that the correction process is performed by a method that the pin portion 75a does not butt against the end wall 85.

The control unit 35 detects that the shift drum 71 is positioned at any of the position corresponding to the neutral state and the positions of the first speed position to the sixth speed position from the output from the position sensor 79 illustrated in FIG. 5.

Furthermore, the control unit 35 can detect whether the shift drum 71 is positioned at the position of the neutral state from the output from the neutral sensor 80 illustrated in FIG. 4.

Here, the position sensor 79 and the neutral recess 84a are configured such that the position of the shift drum 71 can be detected with high accuracy compared with that of the neutral sensor 80.

Although the control unit 35 cannot detect the neutral state only from the output from the position sensor 79, the combination of the output from the position sensor 79 and the output from the neutral sensor 80 allows the correct detection of the neutral state.

That is, when both of the output indicating that the positioning at any of the positions by the position sensor 79 and the output indicating the neutral state by the neutral sensor 80 are input, the control unit 35 determines that the shift drum 71 is positioned at the position of the neutral state.

With reference to FIG. 8, in the correction process, the control unit 35 takes the rotation angle of the shift drum 71 when the neutral state is detected by the position sensor 79 and the neutral sensor 80 as the first rotation angle A1 and obtains the output value S of the first rotation angle A1 as the first output value S1.

Then, the control unit 35 corrects the output value S of the first rotation angle A1, namely, the first output value S1, based on the difference D1 between the first output value S1 and the first reference value R1 as the reference value R at the first rotation angle A1. In detail, the control unit 35 corrects the first output value S1 such that the difference D1 decreases.

The control unit 35 obtains the difference D2 by the method identical to that of the first embodiment and performs the correction process based on the difference D1 and the difference D2.

It should be understood that the above-described embodiments are given to illustrate an aspect where the present invention is applied, and the present invention is not limited to the first or second embodiment.

In the first and second embodiments, it has been described that the first rotation angle A1 is the closest to the turning angle θN of the (N-N) position and the second rotation angle A2 is the closest to the turning angle θ6 of the (N-6) position corresponding to the sixth speed position. Here, "the closest" includes a case where the first rotation angle A1 is same as the turning angle θN and a case where the second rotation angle A2 is same as the turning angle θ6.

Although in the first and second embodiments, the description has been given with an example of the transmission 40 of the motorcycle 1, the present invention is not limited to this. The present invention is applicable to a transmission of a three-wheel vehicle including two front wheels or rear wheels and a vehicle including four or more wheels.

REFERENCE SIGNS LIST

35 ... Control unit
40 ... Transmission
71 ... Shift drum
71b ... Second lead groove (lead groove)
72 ... Actuator
73 ... Deceleration gear unit
75 ... Shifter
75a ... Pin portion
78 ... Angular sensor
85 ... End wall
85a ... Abutment surface
85b ... Curved surface portion
86 ... End wall
86a ... Abutment surface
86b ... Curved surface portion
A1 ... First rotation angle
A2 ... Second rotation angle
D1 ... Difference
D2 ... Difference
R ... Reference value (reference value between the first rotation angle and the second rotation angle)
R1 ... First reference value (reference value of an output value at the first rotation angle)
R2 ... Second reference value (reference value of an output value at the second rotation angle)
S ... Output value
S1 ... First output value
S2 ... Second output value
Vc ... Correction amount
Vs ... Predetermined value
θ6 ... Turning angle (angle of a position corresponding to the uppermost position of shift)
θN ... Turning angle (angle of a position corresponding to the lowest position of the shift)

The invention claimed is:

1. A transmission comprising:
a shift drum rotated by an actuator;
an angular sensor configured to output the rotation of the shift drum as an output value; and
a control unit including a processor and configured to calculate a rotation angle of the shift drum from the output value,
wherein the control unit has reference values of the output values at a first rotation angle and a second rotation angle of the shift drum, the second rotation angle being different from the first rotation angle,
the control unit is configured to obtain the output values at the first rotation angle and the second rotation angle as a first output value and a second output value, respectively, and
the control unit is configured to correct the output value output between the first rotation angle and the second rotation angle based on a difference between the first output value and the reference value at the first rotation angle and a difference between the second output value and the reference value at the second rotation angle.

2. The transmission according to claim 1,
wherein the rotation angle of the shift drum is linearly correlated with the output value from the angular sensor, and
a reference value between the first rotation angle and the second rotation angle is represented by a straight line corresponding to the rotation angle.

3. The transmission according to claim 1,
wherein the shift drum has positions corresponding to respective shift positions, the first rotation angle is closest to an angle of the position corresponding to a lowest position of a shift among a plurality of the positions, and the second rotation angle is closest to an angle of the position corresponding to an uppermost position of the shift among the plurality of positions.

4. The transmission according to claim 3,
wherein the shift drum includes a lead groove that extends in a rotation direction of the shift drum, a shifter that includes a pin portion engaging with the lead groove is disposed, and the shift is performed by moving the shifter along the lead groove via the pin portion,
the lead groove has end walls on both ends in the rotation direction of the shift drum, and
the first rotation angle is an angle at which the pin portion butts against one of the end walls, and the second rotation angle is an angle at which the pin portion butts against the other end wall.

5. The transmission according to claim 4,
wherein the pin portion has a columnar shape, the end walls have abutment surfaces abutting on an outer periphery of the pin portion, and the abutment surfaces have a curvature smaller than a curvature of the outer periphery of the pin portion.

6. The transmission according to claim 5,
wherein the abutment surfaces are flat surfaces.

7. The transmission according to claim 5,
wherein curved surface portions continuous with the abutment surfaces are formed on both ends in a width direction of the lead groove, and
the curved surface portions have a curvature larger than the curvature of the outer periphery of the pin portion.

8. The transmission according to claim 1,
wherein the shift drum is directly rotatively driven by the actuator via a deceleration gear unit disposed between the actuator and the shift drum, and
the actuator is configured to rotate the shift drum by feedback control using the output value.

9. The transmission according to claim 1,
wherein the control unit is configured such that when a correction amount of the output value exceeds a predetermined value, the control unit determines that the angular sensor has a failure.

* * * * *